United States Patent [19]

Dahlquist et al.

[11] 3,809,824

[45] May 7, 1974

[54] PRIVATE AUTOMATIC TELEPHONE SYSTEM WITH DIAL AND DIALLESS TELEPHONES

[75] Inventors: James E. Dahlquist, Elk Grove Village; Richard J. Medal, Mount Prospect, both of Ill.

[73] Assignee: Rauland-Borg Corporation, Chicago, Ill.

[22] Filed: Mar. 31, 1972

[21] Appl. No.: 240,122

[52] U.S. Cl........... 179/37, 179/18 AD, 179/18 BC, 179/84 L

[51] Int. Cl............................................. H04q 3/42

[58] Field of Search.......... 179/27 B, 39, 38, 37, 40, 179/84 L, 18 BC, 18 BB, 18 BD, 18 BF, 18 E, 18 EA, 18 AB, 18 BG, 18 HB, 18 AD

[56] References Cited

UNITED STATES PATENTS

| | | | |
|---|---|---|---|
| 3,701,853 | 10/1972 | Duval et al. | 179/18 HA |
| 3,697,700 | 10/1972 | Greason, III et al. | 179/18 AB |
| 3,678,208 | 7/1972 | Eddy | 179/18 GE |
| 3,553,385 | 1/1971 | Morgan et al. | 179/18 BG |
| 3,551,601 | 12/1970 | Sloan et al. | 179/18 E |
| 3,501,596 | 3/1970 | Bierman | 179/18 BG |
| 3,350,508 | 10/1967 | Swanson | 179/18 HB |
| 2,911,477 | 11/1959 | Gohorel et al. | 179/18 E |
| 3,584,151 | 6/1971 | Kielar | 179/1 H |
| 3,342,944 | 9/1967 | Barbato et al. | 179/37 X |
| 2,883,472 | 4/1959 | Stehlik | 179/39 |
| 2,966,554 | 12/1960 | DuBois | 179/18 BF |
| 3,660,610 | 5/1972 | Hestad et al. | 179/18 BC |
| 2,258,650 | 10/1941 | Herrick | 179/18 BB |
| 2,261,243 | 11/1941 | Flint | 179/18 BB |

*Primary Examiner*—Thomas W. Brown
*Attorney, Agent, or Firm*—Wolfe, Hubbard, Leydig, Voit & Osann, Ltd.

[57] ABSTRACT

A private automatic telephone system for use in schools and other locations where supervisory control over the use of the telephone system is desired, so that calls between certain telephones cannot be made without the authorization of administrative personnel. The system includes dial and dialless telephones, with the dial telephones being capable of dialing any other telephone within the system in a conventional manner, i.e., the telephone receiver is lifted and the telephone dialed to result in either a ring signal or a busy signal if the called telephone is busy. If a dialless telephone is used to initiate a call, the lifting of its receiver produces a visual indication in an annunciator light panel placed in an area having dial telephones, so that an administrator may respond by dialing the number of the dialless telephone and complete the call. The responding dial telephone may connect one or more additional telephones to the call by momentarily depressing its hook switch, thus enabling the dial telephone to receive dial tone and enable the dialing of the number of the additional telephone and establish a conference call. The administrator may either place his telephone on-hook and occasionally lift the receiver to monitor the call if desired or may permanently disconnect from the conference call by pressing a release button. The system is capable of providing two or more simultaneous independent calls depending upon the number of links that are provided to connect separate telephones in the system.

26 Claims, 13 Drawing Figures

PATENTED MAY 7 1974 3,809,824

SHEET 01 OF 11

PATENTED MAY 7 1974 3,809,824

SHEET 06 OF 11

PATENTED MAY 7 1974 3,809,824

SHEET 10 OF 11

PRIVATE AUTOMATIC TELEPHONE SYSTEM WITH DIAL AND DIALLESS TELEPHONES

This invention relates generally to telephony and, more particularly, relates to a private automatic telephone system particularly adapted for use in buildings, such as schools and the like, where administrative control over the use of certain telephones is desired.

While private telephone systems have long been used in schools and other buildings, they have often utilized a switchboard and switchboard operation to make the desired connections between various telephones, with an off-hook telephone lighting an indicator lamp which is seen by the operator who makes a connection to answer the call. For such systems it is easily realized that dialless telephones may be used with the switchboard operator making the connections between all the telephones. Although several conversations may simultaneously take place, each of the connections between two or more telephones must be made by the switchboard operator at the initiation of the call and must also be manually disconnected after the call is terminated. A disadvantage of such installations is that the speed of placing and completing calls is limited by the proficiency of the switchboard operator.

Conversely, while fully automatic private telephone systems are not limited in the sense that a switchboard operator is required for the completion of telephone calls, such automatic systems inherently have the disadvantage in that calls may be made between telephones without administrative or supervisory control. In school classrooms, for example, it is often desirable to have control over telephone conversations between students in different classrooms to preclude unnecessary use of the telephone system for personal reasons. One relatively unsatisfactory way to preclude initiation of calls from a classroom is to provide dialless telephones in them but, in a fully automatic system, it would be impossible to initiate a call from such locations. It is also desirable that a telephone system have the capability of handling several independent telephone calls simultaneously, particularly if the telephone system is used in a large installation having many telephones and substantial telephone traffic.

Accordingly, it is an object of the present invention to provide a private automatic telephone system wherein administrative control over the use of certain telephones in the system is provided so that calls initiated by such telephones can only be initially completed to administrative personnel and thereafter transferred to other telephones only when the transfer is performed by administrative personnel.

A related object of the present invention is to provide a private automatic telephone system having the above mentioned administrative control which is capable of completing several independent telephone calls simultaneously. Another related object lies in the provision of automatically completing a telephone call to any telephone within the system when a dial telephone is dialed, i.e., such telephone calls are completed automatically without the assistance of a switchboard operator or the like.

Another object of the present invention is to provide a private automatic telephone system that includes dial telephones in administrative areas and dialless telephones in other areas where administrative control and supervision of telephone calls are desired, e.g., classroom locations and the like, wherein calls originating at a dialless telephone are visually indicated on an annunciator panel, thus enabling an administrator seeing the visual indication to dial the dialless telephone and complete the call. A related object lies in the provision for the dial telephone in the completed call to connect an additional telephone in the event the party at the dialless telephone wishes to be connected to another telephone other than the dial telephone that responded to the dialless telephone.

A more detailed object of the present invention is to provide a private administrative telephone system that has a call director module that is effective to initially provide a link or connection between two telephones in the telephone switching matrix, and also includes one or more additional link relay modules into which a call completed in the call director may be transferred so that the call director is free to make subsequent telephone connections when they are initiated. An ancillary object of the present invention lies in the provision for maintaining the connection between two telephones in the call director module in the event all of the additional link relay modules are occupied with other telephone calls.

Yet another detailed object lies in the provision for connecting additional telephones to an existing conversation and thereby establish a conference call between three or more telephones by merely momentarily depressing the hook switch of the dial telephone in the existing connection which generates a hook call signal resulting in the dial telephone receiving dial tone, enabling the number of the additional telephones to be dialed and the telephone connected. A related object lies in the provision for transferring the additional telephone into the link relay module occupied by the original two telephones and complete a three telephone conference call. Still another related object of the present invention involves the capability of the system to connect other additional telephones to the conference call by repeating the hook call procedure.

Another object of the present invention is to provide a private automatic telephone system that has an annunciator including an associated light panel providing a distinct visual indication of unanswered dialless telephones as well as a different visual indication for busy telephones.

Yet another object of the present invention lies in the provision for interrupting the system for initiating an emergency call, in the event the call director module as well as all of the additional link relay modules are occupied.

Other objects and advantages will become apparent upon reading the ensuing specification together with the attached drawings, in which.

Figures 1, 2:
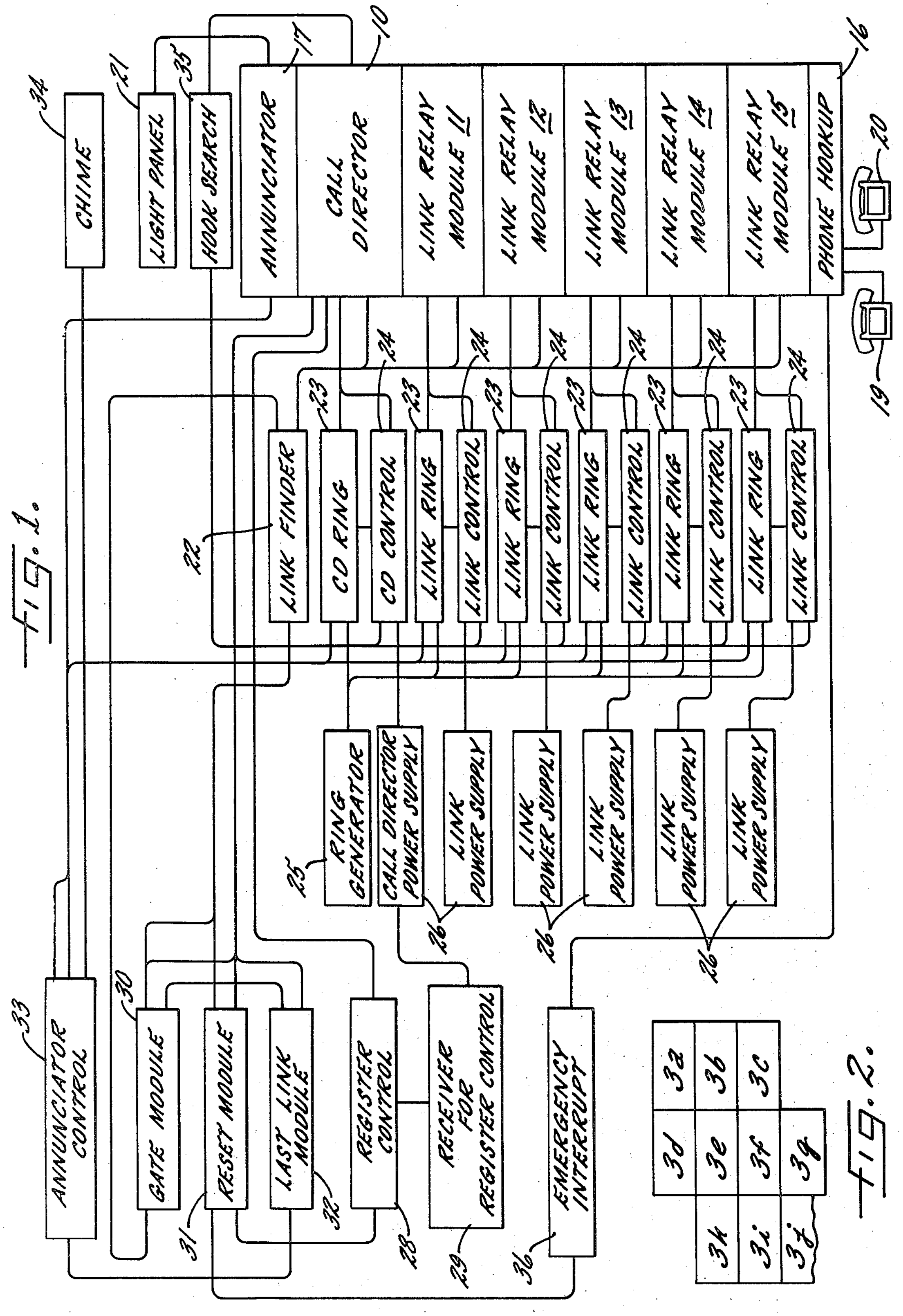
FIG. 1 is a schematic block diagram of the major modules of the telephone system of the present invention.
FIG. 2 is a chart which indicates how the several
Figure 3A:
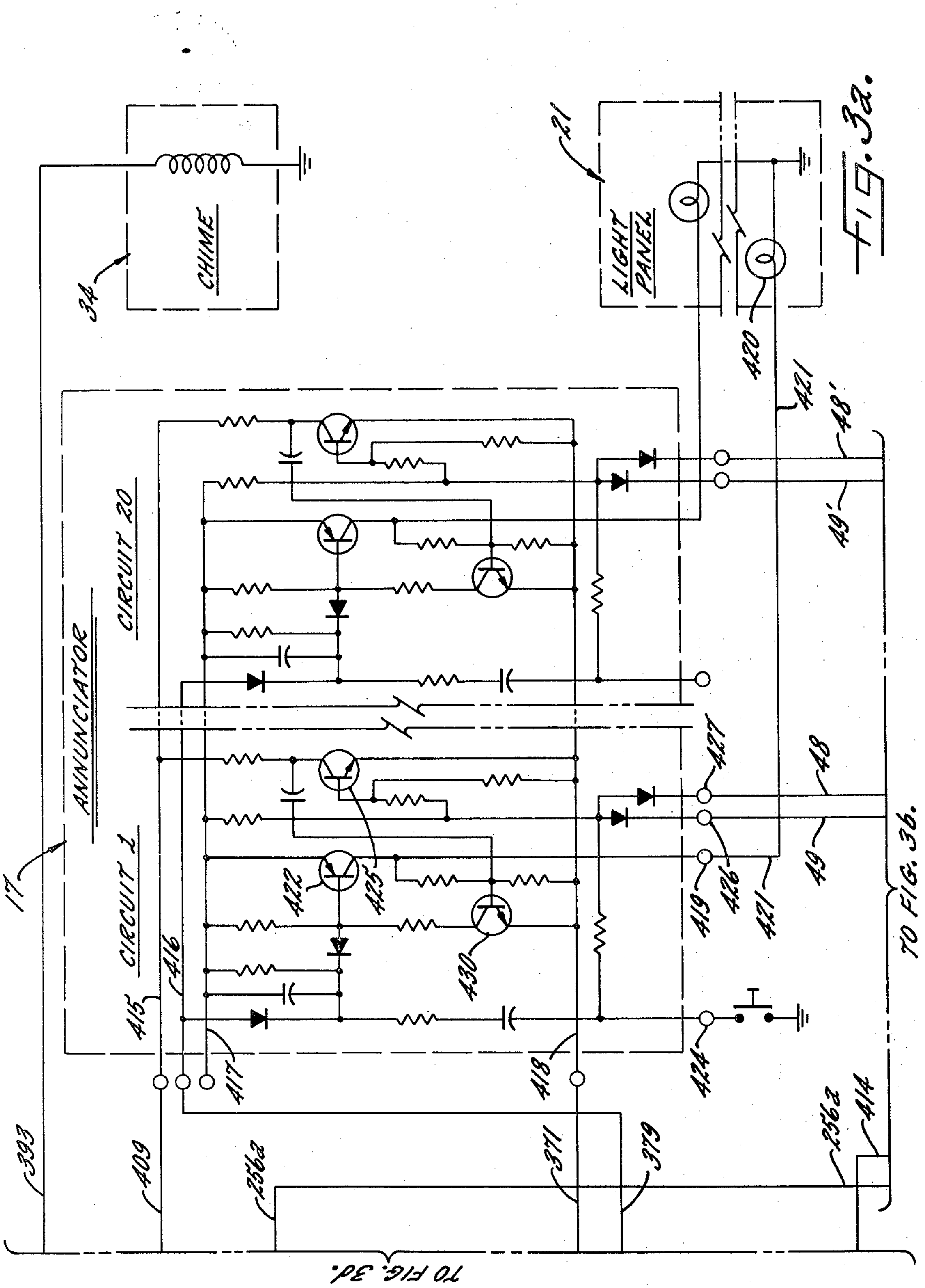
FIGS. 3*a*–3*j* are to be joined together to form a composite FIG. 3.
Figure 3B:
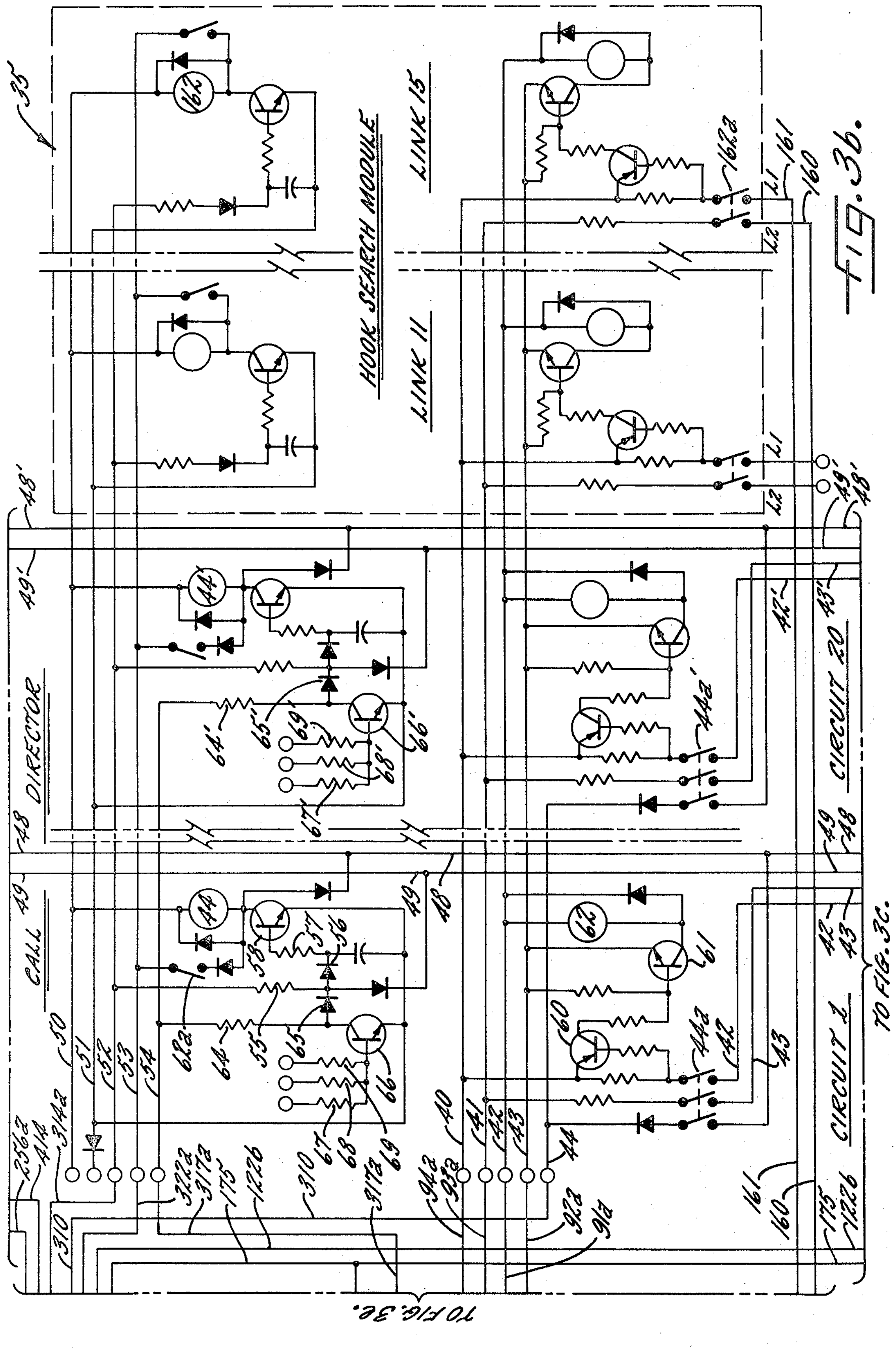
Figure 3C:
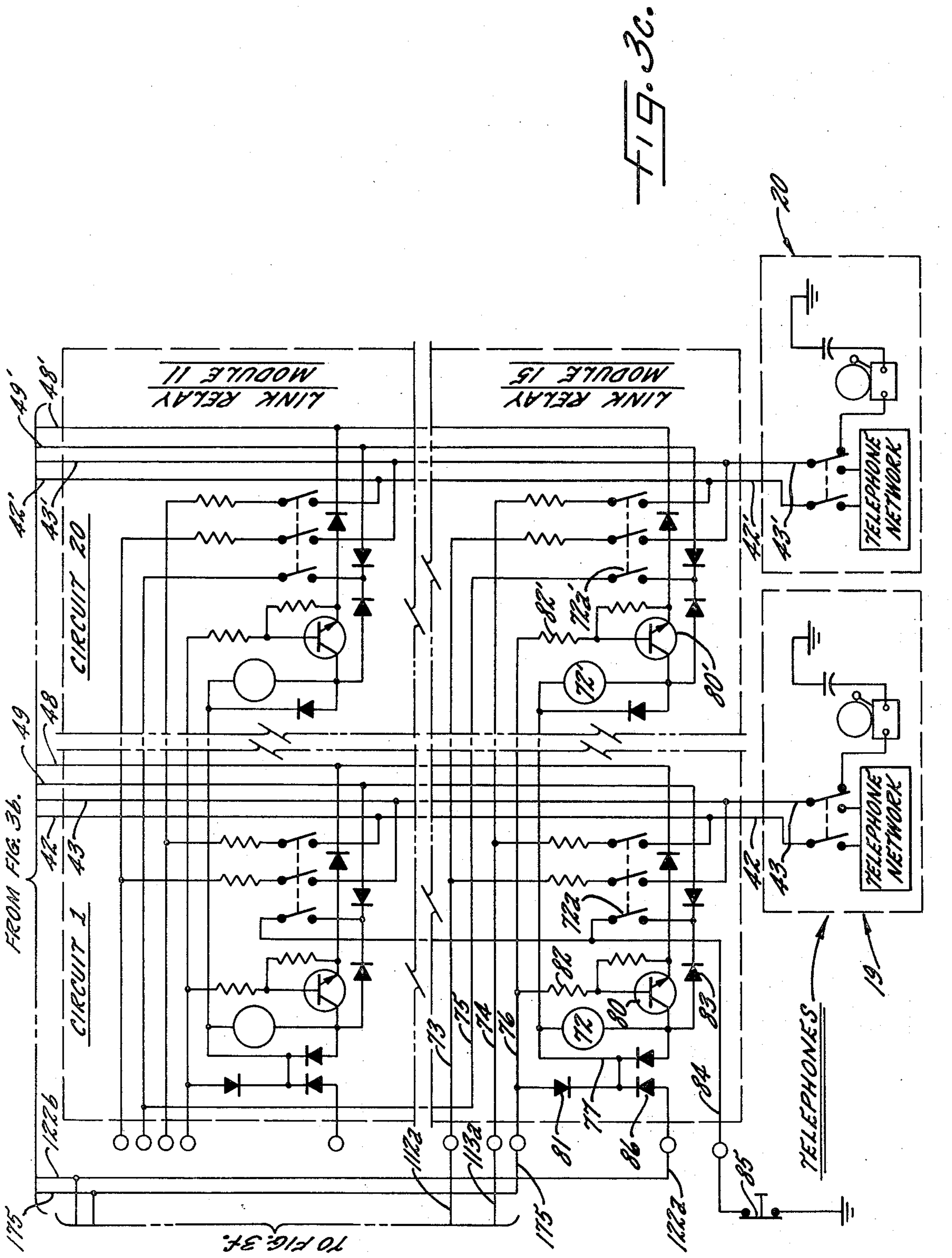
Figure 3D:
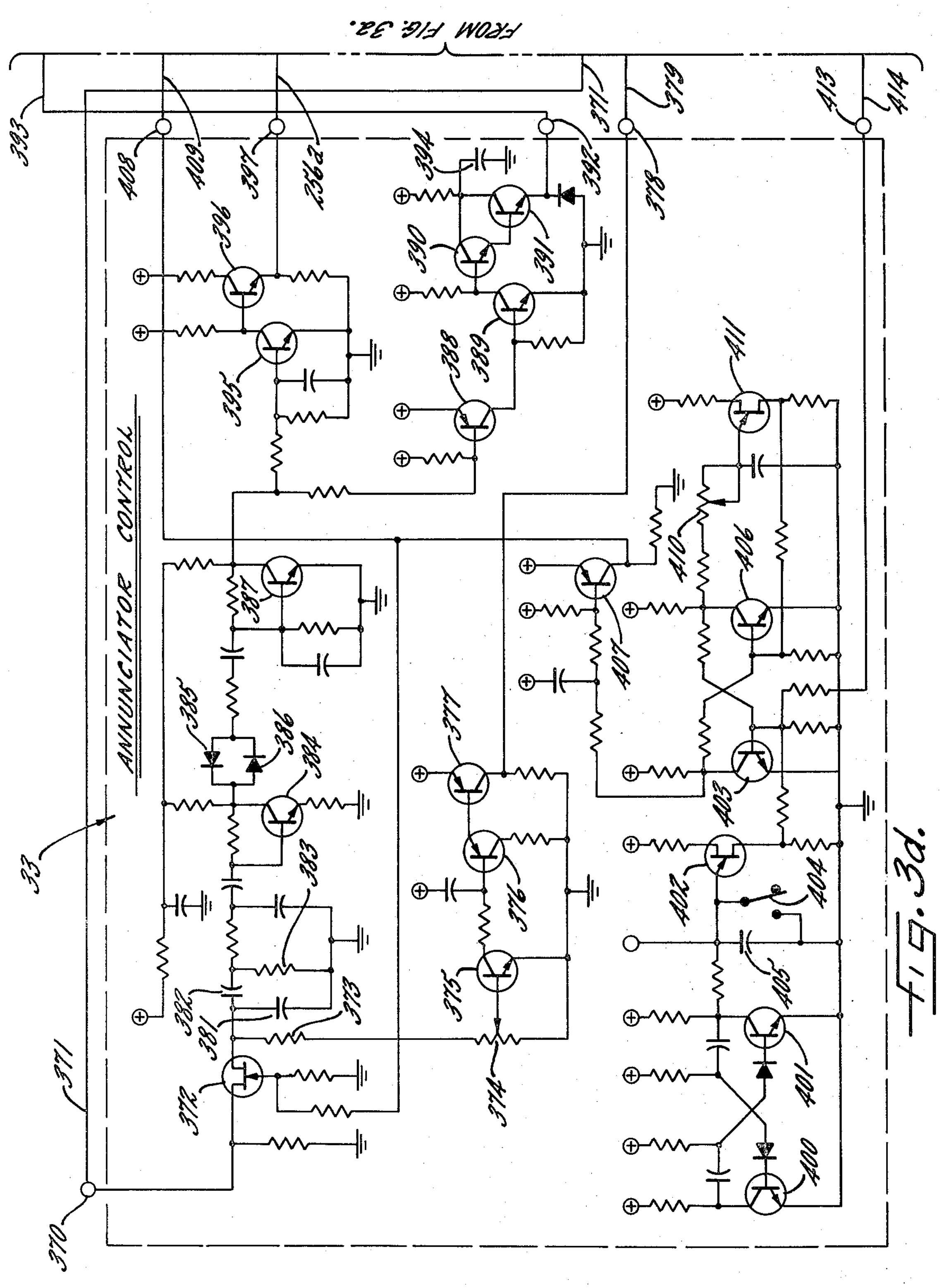
Figure 3E:
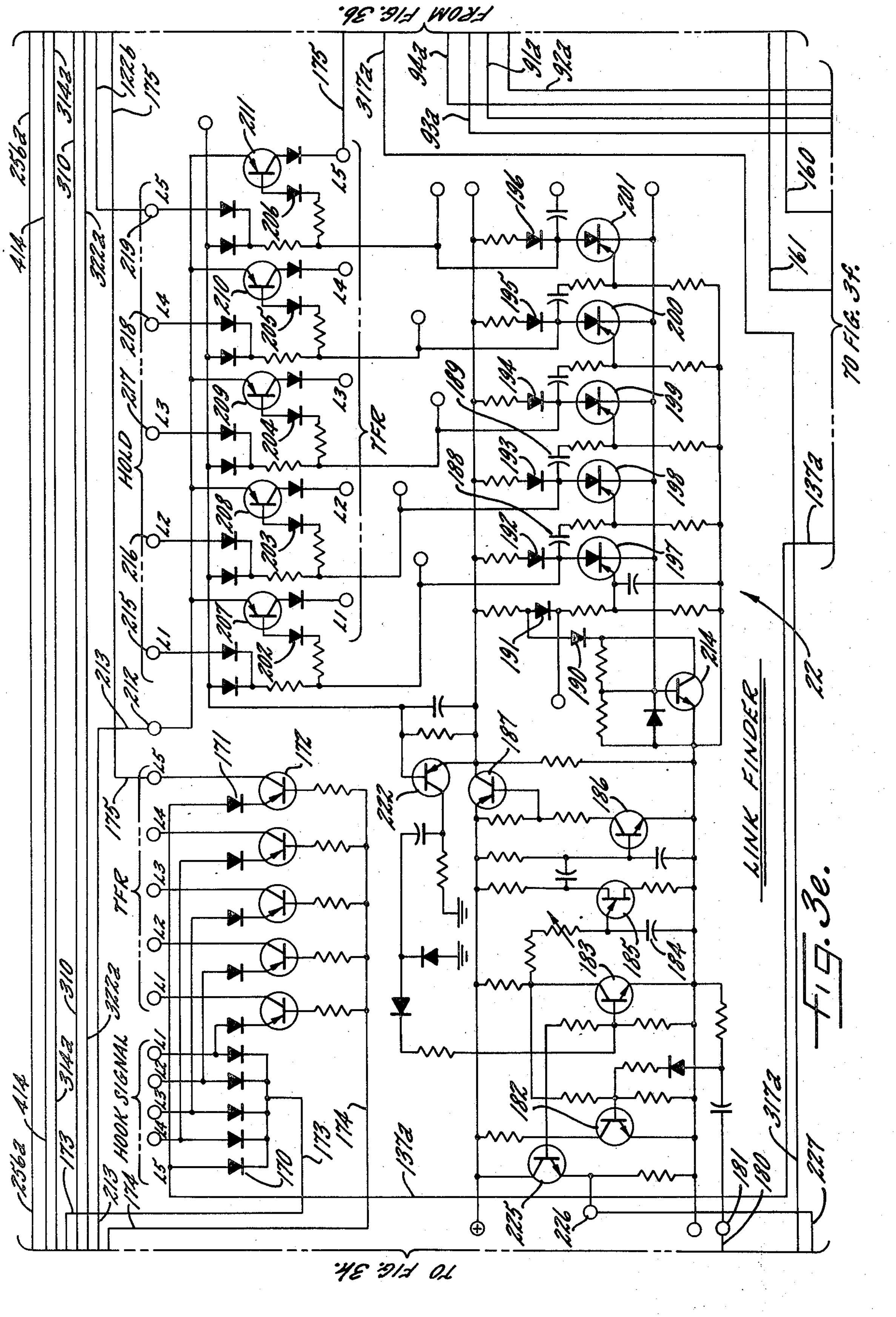
Figure 3F:
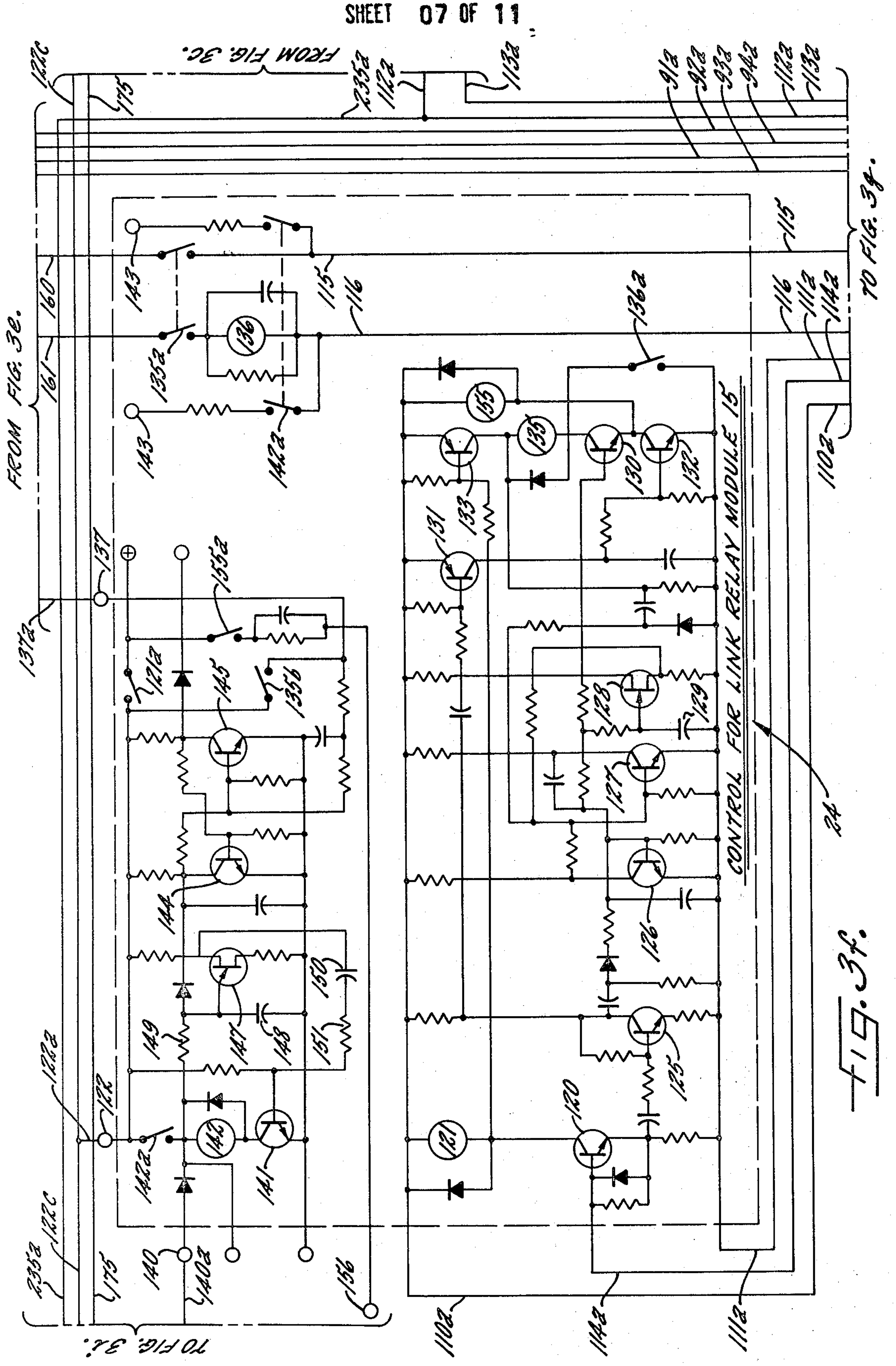
Figure 3G:
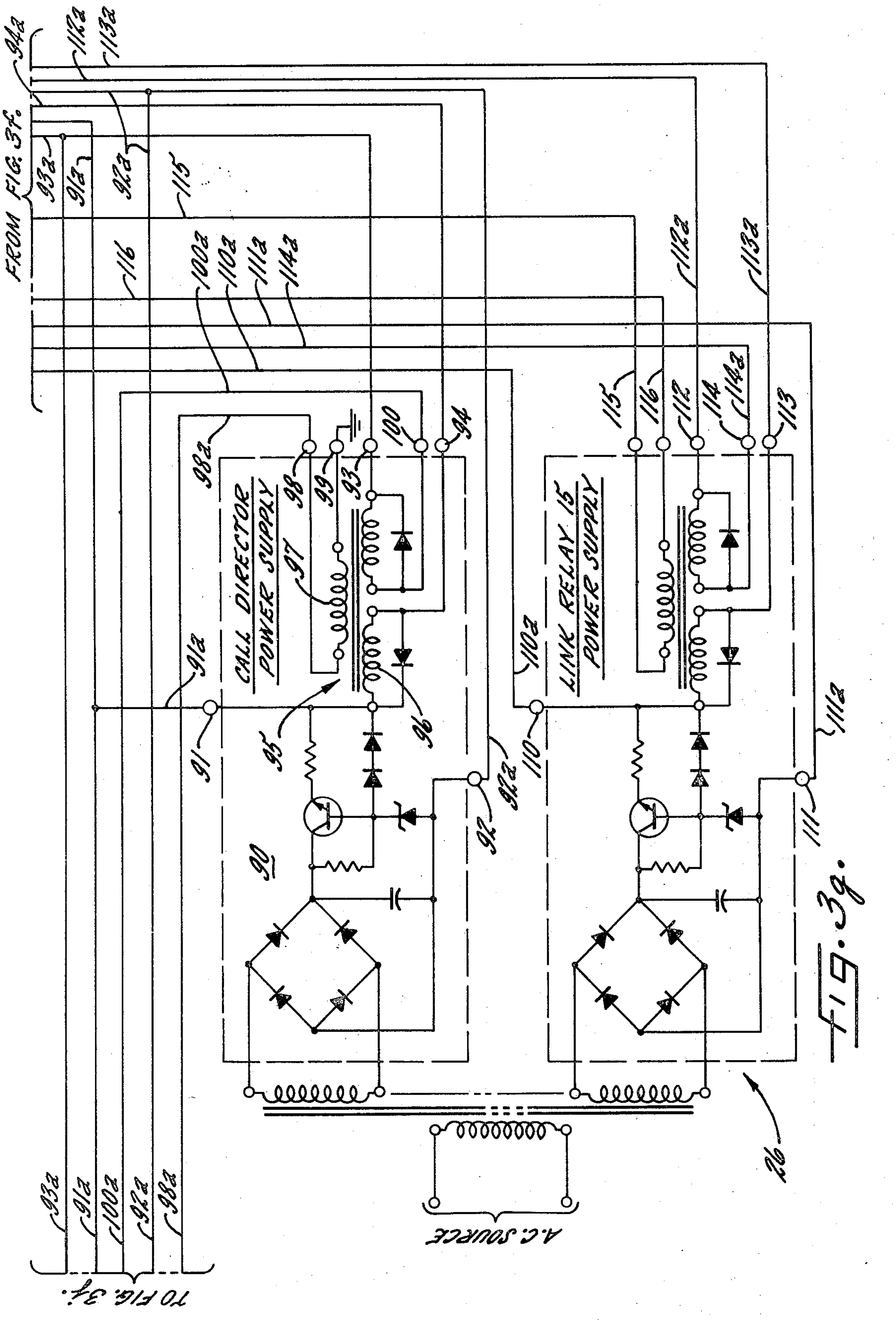
Figure 3H:
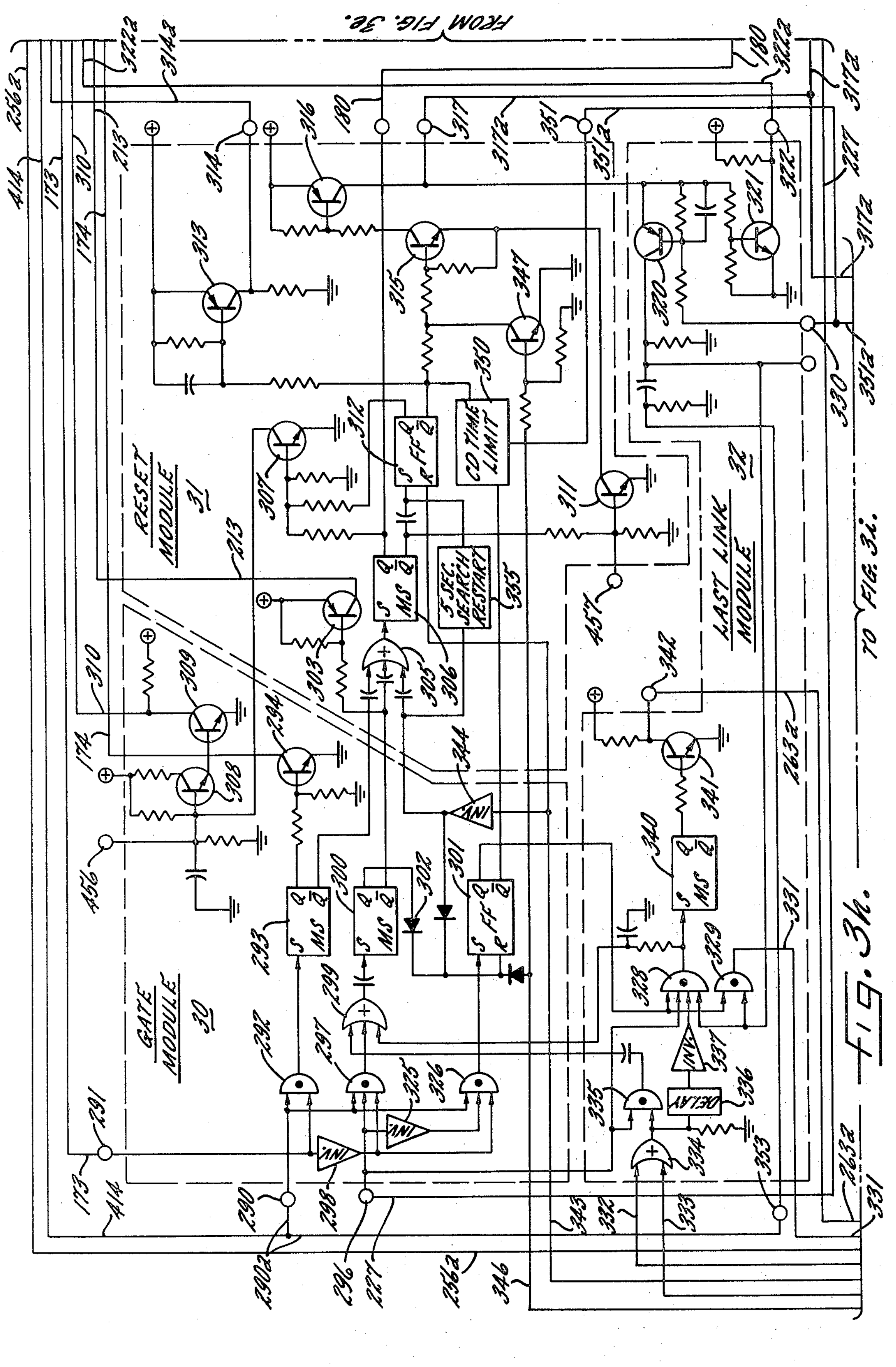
Figure 3I:
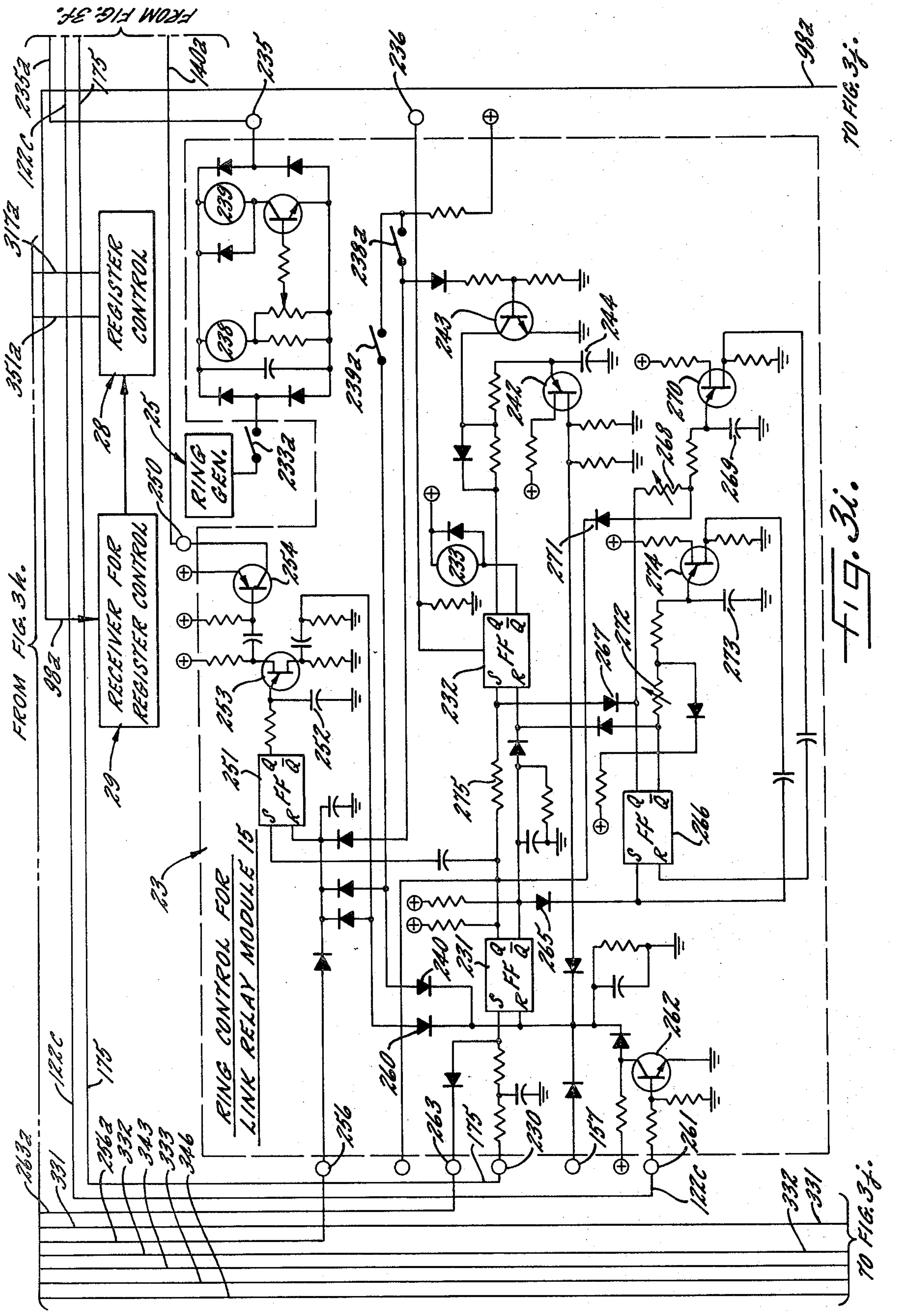
Figures 3J, 4:
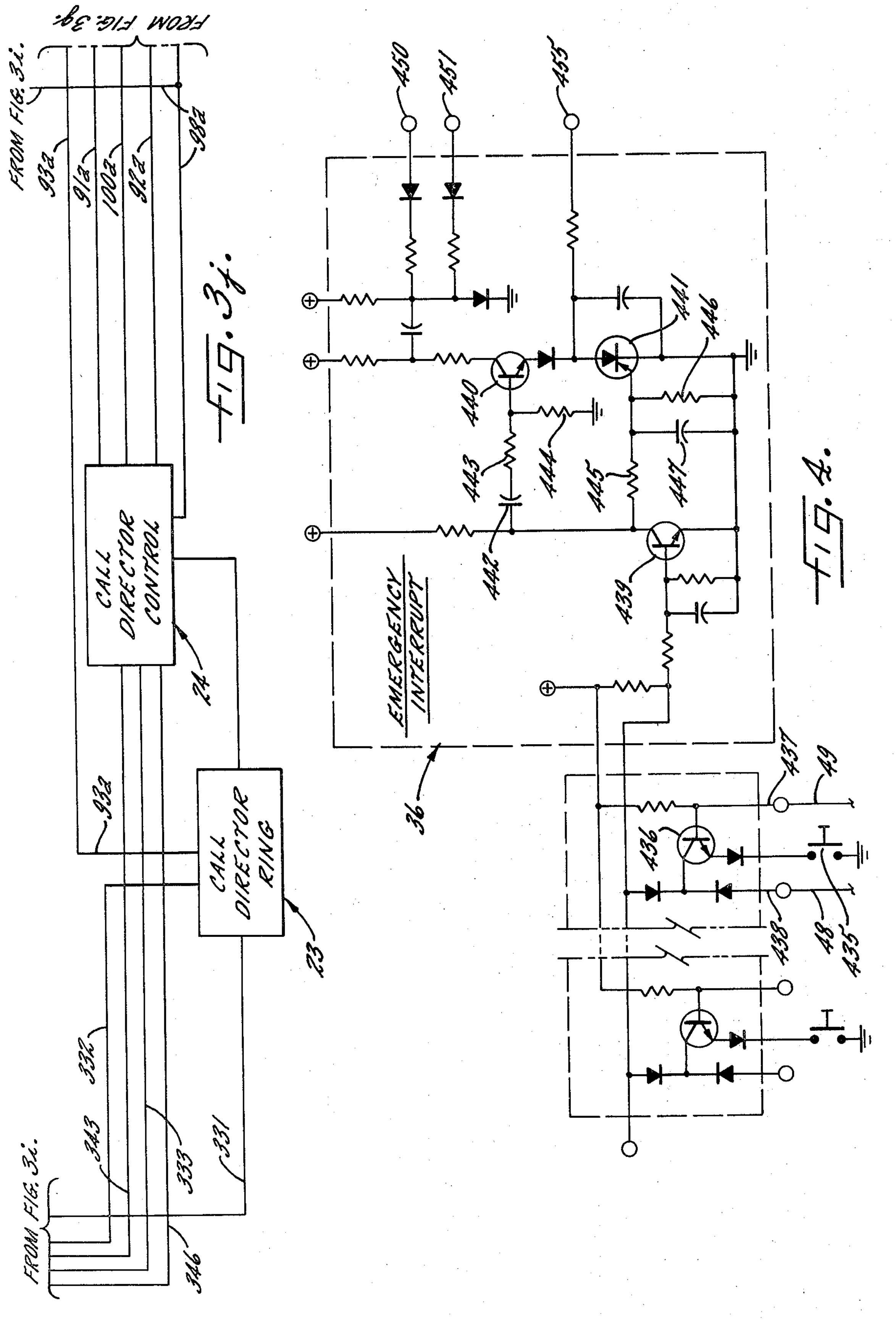

FIGS. 3*a*–3*j*, when joined as indicated in FIG. 2 constitute a substantially complete circuit diagram of the major modules which together represent an exemplary embodiment of the present invention, with certain redundant modules being omitted;

FIG. 4 is a circuit diagram of the emergency interrupt module which may be incorporated into the system.

While the present invention will be described in connection with certain preferred embodiments, it should be understood that it is not intended to limit the invention to these particular embodiments. On the contrary, it is intended to cover all alternatives, modifications and equivalents as may be included within the spirit and scope of the invention as expressed in the appended claims. In this connection, it is noted that exemplary circuit diagrams for various modules of the system are shown in detail in the specification and drawings. It should be understood that one skilled in the art could substitute different circuitry to produce the desired output information, given similar input information and the invention is intended to encompass such alternative circuitry as may be included within the spirit and scope of the invention.

As used herein, the term "signal" is to be taken in a generic sense and is intended to include any electrical manifestation having information content. In certain drawings, digital circuit elements have been symbolically illustrated in the manner in which they are commonly used in the electronics art. In view of the common usage of these elements, it is unnecessary to give a detailed description of the combination of components constituting each logic element, and it will be readily appreciated by one skilled in the art that many different variations and combinations of components can be used to perform the logic function assigned to each circuit. However, a brief description of the operation of these common elements will be helpful in understanding the operation of portions of the circuitry of the present invention. A flip-flop (FF) is a two stage multivibrator circuit having two stable states. In one state, the first stage is conducting and the second stage is cut-off. In the other state, the second stage is conducting and the first stage is cut-off. The flip-flops are illustrated as rectangles, having R and S input terminals at their left sides as illustrated in the drawings, having Q and $\overline{Q}$ output terminals at the right side thereof. When an input signal or pulse is applied to the S-input terminal, the flip-flop is "set" and the desired output signal, normally a "high" voltage, is provided only at the Q-output terminal. When the input signal or pulse is applied to the R-input terminal, the flip-flop is "reset" and the desired output signal, normally a high voltage is provided at the $\overline{Q}$-output terminal only. When an input signal or pulse is shown applied to a separate terminal midway of the input and output terminals, the element is intended to represent a "clocked" flip-flop characterized by the fact that the stable state at the inputs will be shifted to the outputs, respectively, upon the occurrence of a "clock" pulse at the midway terminal.

An OR gate, as used herein, produces a desired output signal in response to an input signal at any one of its input terminals, while an AND gate produces a desired output signal only in response to input signals at all of its input terminals simultaneously. An inverter (INV) converts a positive-going signal into a negative-going signal and vice-versa. Finally, a monostable multivibrator (MS), produces an output pulse of a predetermined width, and therefore of predetermined time duration, in response to an input signal of any width.

Additionally, since the present invention is generally related to the art of telephony, it should be understood that certain words and phrases used herein are meant to convey information concerning the use and operable condition of telephones within the system. For example, an "on-hook" telephone is intended to indicate that its hook switch is depressed as would occur when the receiver of the telephone is resting in its cradle. Similarly, an "off-hook" telephone is one in which the hook switch of the telephone is extended as would occur when the receiver is lifted from its hook or cradle. A completed telephone "call" is intended to mean that two or more telephones within the system are connected to permit voice communication between them, with a "conference call" merely meaning that three or more telephones are connected together in like manner. Moreover, two or more telephones are normally connected together through a "switching matrix", with the individual telephone lines being the vertical lines of the matrix and the horizontal connection between the two or more telephone lines being provided by "links" which complete the connection. Other words and phrases having common meaning may be described in the ensuing specification.

Referring to the private telephone system of the present invention in terms of its general operation and function, the system is adapted to include up to 999 telephones which may be predominantly of the dial or dialless type. The location of a telephone typically dictates whether the particular telephone should be a dial or dialless telephone. If the system is installed in a school, for example, dialless telephones are typically placed in the classrooms and standard push button dial telephones are placed in the administrative office areas, as well as other locations where supervisory control over the initiation of such calls would not be desired. The system is adapted to provide automatic operation in the sense that any dial telephone may be used to dial any other telephone in the system by raising the receiver to receive dial tone which enables a person to push button dial a three digit number of the desired recipient telephone which causes ringing in that telephone or a busy signal if the recipient telephone is busy. Thus, calls may be completed from any dial telephone automatically by using the procedure that is quite similar to the public telephone system.

Supervisory or administrative control over the dialless telephones is provided in the sense that calls initiated from such dialless telephones may not be completed without being at least tacitly cleared or authorized by an administrator since such calls must go through an administrative dial telephone. An administrator responding to an off-hook, unanswered dialless telephone may determine who is initiating the call, what the purpose of the call is, as well as the location of the requested recipient telephone before the administrative person "transfers" the call to the requested recipient telephone. Thus, it is possible for an administrative person to screen unauthorized calls between classrooms.

The system includes a call annunciator having an associated light panel, which may have a numbered light corresponding to the number of each of the telephones within the system. The annunciator is adapted to provide a distinct visual indication for any telephone that is engaged in a telephone call or, in the case of a dialless telephone being off-hook or previously off-hook and unanswered, a visual indication that is different from the visual indication for a busy telephone annunciator light panel is typically located in an administrative area having one or more dial telephones.

To initiate a telephone call from a dialless telephone, the receiver is merely taken off-hook which is effective to provide a full brightness visual indication on the light of the number of the off-hook telephone in the annunciator light panel. The calling party may either keep the dialless telephone off-hook or replace the receiver to place the telephone in on-hook condition if desired. The full brightness visual indication on the annunciator light panel will remain until the dialless telephone initiating the call is responded to by being called by a dialless telephone.

To respond to the dialless telephone initiating the call, any of the administrative personnel having a dial telephone who see the visual indication on the annunciator light panel may pick up their receiver and dial the number associated with the dialless telephone to establish a two way telephone call. If the administrative person responding to the call is not the person to which the party at the dialless telephone wishes to talk to, the administrative person may connect the dialless telephone to any other non-busy telephone in the system by merely initiating a "hook call".

To initiate a hook call, the administrative person merely momentarily depresses the hook switch of his dial telephone which is detected by the system and provides a dial tone to the dial telephone thus enabling the administrative person to push button dial the telephone of the other party to which the party at the dialless telephone wishes to speak with. When the additional telephone is answered, the three telephones are connected together, in a conference call. The administrative person initiating the hook call may then place his telephone on-hook without disconnecting the other two telephones in the call and may intermittently monitor a call between the other telephones if desired by merely lifting his telephone receiver and listening.

To permanently disconnect the dial telephone initiating the hook call, a certain number of the administrative dial telephones may be provided with a separate release push button which is effective to permanently disconnect the telephone from the conversation. Thus, after the telephone has been released, it is free to initiate other calls or to respond to other dialless telephones producing a visual indication on the annunciator light panel which indicates that they are unanswered.

In accordance with an important aspect of the present invention, the telephone system is capable of maintaining several independent two way conversations or calls at one time, with the number of simultaneous telephone calls being a function of the number of link relay modules that are provided in the system. As previously mentioned, a link is a horizontal connection between two or more telephone lines in the switching matrix. The number of links that are provided in the system is variable but, in the exemplary embodiment illustrated herein, it is contemplated that up to ten separate link relay modules will normally accommodate the telephone traffic in a system that has up to 999 telephones.

Although the system may include up to 10 links for maintaining 10 separate simultaneous telephone calls, all of the connections between two telephones are completed through a separate call director module which is adapted to provide an initial link for connecting two telephones. Upon completion of the connection between two telephones, the system is adapted to transfer the completed telephone call into one of the available or unoccupied links of the system. After the call has been transferred to one of such links, the call director is free to complete other telephone calls that are placed in the system.

Referring to the schematic block diagram of the system of the present invention illustrated in FIG. 1, the various modules or system components are shown with lines between the modules representing electrical interconnections for their operation. Referring to the right hand portion of FIG. 1, there is shown a call director module 10 together with a number of link relay modules 11–15, a telephone hook-up panel 16 and an annunciator 17. Individual telephones 19 and 20 represent two of a plurality of telephones that are connected to the system. It should be understood that the block diagram illustrates a total of five link relay modules but that a lesser or greater number of such modules may be included in the system. The telephone line can be generally understood to represent vertical lines in the switching matrix, with the call director as well as the link relay modules providing horizontal links for connecting any two or more telephones together in a telephone call.

The initial connection between any two telephones is provided by the call director 10 and upon completion of dialing of the recipient telephone, it is transferred to an unoccupied or available link relay module, which transfer frees the call director to be reset to make the initial completion of other telephone calls that are subsequently initiated in the system. The annunciator 17 is also connected to each of the individual telephones and has an associated lamp bank or light panel 21 for indicating whether the individual telephones are in use. A link finder module 22 is provided to find an unoccupied link relay module into which the completed call may be transferred from the call director 10. Associated with the call director as well as each of the link relay modules are ring and control modules 23 and 24, respectively, which provide ring and busy signal control in addition to other functions which will be hereinafter described. A ring signal generator 25 is connected to each of the ring control modules 23 and supplies a ring signal which the ring control module selectively passes to the call director or link relay module and therefore to preselected telephones if they are connected in the switching matrix.

A power supply 26 is provided for the call director as well as for each of the link control modules and provides the power for the talk lines during a telephone call that is linked or connected in either the call director or in one of the link relay modules. Thus, the power supply for the call director is connected to the call director control module and is also directly connected to the call director itself and similarly, each of the link power supplies are connected to their respective link control and link relay modules.

A register control module 28 and an associated receiver 29 are connected to an audio pick-off coil of the call director power supply as well as to a reset module 31. The register equipment provides dial tone as well as dialed coding information for connecting selected telephone lines in the call director responsive to the push button dialing of a three digit number. Upon completion of the third dialed digit, a signal is passed to a gate module 30 which determines whether the call is a standard or regular call, as distinguished from a hook call and is effective to provide for transfer of the proposed call from the call director 10 to one of the link relay modules by virtue of its interconnection with the link finder module 22. Since the call director has different modes of operation as will be more fully described hereinafter, the gate module is also adapted to maintain a completed call in the call director in the event all of the link relay modules are occupied. If no link relay module is available, the gate module passes information to a last link module 32 which maintains the call in the call director. Thus, it should be understood that the call director is adapted to provide an additional "last link" in the system for maintaining a telephone call in the event all of the link relay modules are occupied and therefore unavailable to receive a telephone call that would otherwise be transferred from the call director. Once a link relay module becomes available, the transfer is accomplished and a reset module 31 is effective to place the call director in condition to complete additional telephone calls initiated by dial telephones in the system.

An annunciator control module 33 is also provided to sound a chime 34 which is preferably located in the annunciator light panel 21 and is adapted to sound when a dialless telephone goes off-hook for the purpose of initiating a telephone call. The annunciator control module 33 also performs other functions that will hereinafter be described in greater detail.

Prior to describing the manner of operation of the various modules terms of the circuitry illustrated in composite FIG. 3, the functions performed by each of the modules will now be more specifically described.

The call director 10, as previously stated, provides the initial connection between any two telephones. The call director functions in three distinct modes of operation which can generally be described as search, hold and transfer modes. When the call director is in its search mode, it is adapted to apply voltage on all "searched" dial telephone lines, since the relays are closed in this mode to connect all telephone lines. Then, responsive to a dial telephone going off-hook and drawing current, all other relays drop out, maintaining the connection to the off-hook telephone, while isolating all other searched telephones. Thus, the telephone line of the off-hook telephone is connected to a horizontal line of the switching matrix which will become a link if another telephone line is subsequently connected to it. The initial connection of the off-hook telephone places the call director in a hold mode which precludes it from searching for other off-hook dial telephones. After the off-hook telephone dials three digits which causes the relay of the recipient telephone line to close and link the telephones together, the call director is changed to its transfer mode which, in conjunction with the gate and reset modules 30, 31 transfers the lines to one of the available link relay modules. The completion of the transfer causes the reset module 31 to again place the call director 10 in its search mode making it available to detect other off-hook dial telephones. It should be understood that the call director 10 is only unavailable for searching for the time required for a dial telephone to receive dial tone and complete the dialing of a three digit number.

However, in accordance with an important aspect of the present invention, the call director is also adapted to function as a continuing link to maintain a telephone conversation therein, in the event all of the link relay modules are occupied with other telephone calls. Thus, the gate module 30 and last link module 32, in conjunction with the link finder module 22 will note the occupied condition of all link relay modules and will accordingly not transfer the connection between the two telephones until a link relay module becomes available. The call director thus functions as a "last link" when all of the relay modules are occupied.

The register control module 28 and associated receiver module 29 are of conventional design for operating telephones having push button "tone" dialing. The modules are designed for use in a low voltage system preferably about 12 volts, and have 30 output wires, with 10 wires being associated with the 10 digits in each of the units column, the tens column and the hundreds column. By dialing a three digit number, the register equipment produces a low or ground output signal in one of the lines for each of the units, tens and hundreds column which provides coding information to the call director causing it to connect to the dialed telephone. All of the outputs in the other 27 lines remain at a high (12 volt) level.

The ring control module 23 associated with each of the link relay modules, as well as the call director, is operable to intermittently communicate the ring signal provided by the ring generator 25 to the called telephone. The ring signal is initiated by either a start ring pulse from the last link module 32 if the call is being maintained in the call director operating as a last link or by a transfer in signal if the call is being transferred to an available link relay module. The ring control module also terminates transmission of the ring signal if ring current is not present during application of ring voltage, a stop ring signal is received, ring overload occurs, a busy start signal occurs, or the hold signal is terminated, indicating that the calling party has hung up. The ring control module also provides a signal to start the busy signal generator associated with the link control module 24 in the event that ring current is not present immediately following the start ring signal. The ring control module provides a signal to inhibit the starting of ring signal if the call is subsequently transferred from the call director operating as a last link to a link relay module that becomes available. This is required because a start busy signal would result since the called telephone would be off-hook and would not immediately draw ring current and a busy signal would result. Thus, unless the ring start signal is inhibited, it would result in a busy signal being generated which would interfere with the call that is occurring. The ring control module is also adapted to ring the called telephone immediately upon completion of the dialing of the last digit of the telephone number and additionally provides closing of the ring supply relay only when the supply signal is passing through zero which is effective to prolong the life of the relay contacts, since the ring supply signal is typically of a higher voltage, for example, 110 volts. The ring control module is also adjustable to vary the duration of the intermittent ring signals as well as the duration of the pauses between them.

Each of the call director control and link control modules 24 detect current flow from the associated power supply to a telephone line connected to a link relay module or call director indicating that a telephone is off-hook by providing a holding signal. The control modules are also adapted to detect the occurrence of a hook call and, responsive to such detection, provide a hook call identification signal that informs the link finder module to transfer the additional called telephone into the proper link occupied by the original dial telephone that initiated the hook call. Additionally, the control modules communicate a busy signal from a busy signal generator responsive to the start busy signal provided by the ring control modules and also terminates a hook call busy signal automatically after a short time so that the original telephone call may continue without a busy indication.

The link and call director power supplies are connected to their corresponding link relay modules as well as the corresponding link or call director control module 24 and provide a regulated 12 volt d.c. supply which provides the power for the talk lines in the telephones that are connected by a link relay module or the call director. The power supplies also have provision for an audio tap or pick-off coil which is required for the capability of the system to make the previously described hook calls.

The link finder module 22 sequentially scans each of the link relay modules for the purpose of finding an available or unoccupied link and provides a signal to the gate module 30 when a link is ready or available. The link finder module then stops the sequential scanning after finding an available link relay module and, when a call is transferred to that link relay module, it receives a signal from the reset module 31 indicating that it should begin scanning for other available links. The link finder module responsive to a signal from the reset module 31 indicating the transfer should be performed, provides a signal to the available link relay module into which a call is to be transferred which closes the connecting relays in that link. In the event all of the link relay modules are occupied and therefore unavailable, the link ready signal is not communicated to the gate module 30. The link finder module also functions to route the hook call transfer signal to the initiating link relay module, such that any additional telephones connected to the call director by the hook call procedure are transferred into the initiating link occupied by the dial telephone that initiated the hook call. The link finder module also provides a signal to the gate module 30 indicating that a hook call is required.

The gate module 30 is largely comprised of logic circuitry which receives an indication that the final third digit has been dialed, whether the call is a regular call as distinguished from a hook call, that a link is ready and provides output signals which activate the link finder module to transfer a telephone added to an existing call by the hook call procedure to the proper link. In addition to these functions, the gate module provides a signal to the last link module 32 in the event all link relay modules are busy, which is effective to cause the call director to function as a last link and maintain the call in the call director.

The reset module 31 receives signals from the gate module 30 indicating that transfer of a regular call to a ready link should be accomplished and provides signal to the link finder module 22 to start the transfer. The reset module also provides signals for changing the call director back into its search mode. Additionally, the reset module provides a time limit in which a person may dial another telephone which is desirable in order to preclude a person from tying up the call director for an inordinate amount of time which would preclude other calls from being placed.

The last link module 32 is operable to maintain a completed call in the call director when all of the link relay modules are occupied and does so by providing a hold signal to the call director to hold the connection in the call director until a link relay module becomes available. The last link module also provides a signal to inhibit a ring start signal to any ring control module when the call is subsequently transferred to that link after voice communication has been established.

The annunciator control module 33 contains a pulse generating oscillator which provides a signal to the annunciator to indicate that telephones are busy by flashing and reducing the level of brightness of the lamps associated with the busy telephone if desired. It may also be switched to have the lights of the telephones go off immediately upon the dialing of the third digit at the initiation of the call. The annunciator control module also provides the output pulse for sounding the chime incident to a dialless telephone initially going off-hook and also provides for lighting the associated lights at full brightness to indicate unanswered dialless telephones that were taken off-hook. In addition to these functions, the annunciator control module provides an overload signal to the annunciator in the event more than a predetermined number of lights are on at any one time. The module also provides a signal to the various ring control modules for stopping the busy start signal from being given whenever a lamp is released from its steady to a flashing condition. This occurrence indicates that the line was not busy. Thus, if the dialless telephone is waiting off-hook, the first ring current will be rejected, the usual busy signal will not be initiated and communication is established at once.

The annunciator 17 turns on the lamp in the light panel 21 responsive to a dialless telephone going off-hook and also accepts the oscillator pulse output of the annunciator control module and selectively applies the pulse generator output to the lamps associated with busy telephones in the system. Additionally, it precludes lamps being lighted if the annunciator control module has signaled that the annunciator has exceeded its maximum capacity with respect to the number of lamps that are on.

The hook search module 35 is adapted to provide an extension of the call director and is only used for completing a hook call. Thus, a telephone connected in a link relay module may be in voice communication with another telephone connected in the call director through the hook search module. However, the module cannot provide for transfer of the connected telephone in the call director to the link occupied by the telephone in the link relay module initiating the hook call.

The emergency interrupt module 36 is adapted to enable those dial telephones having an interrupt switch added thereto to cut in upon a telephone call that is transpiring in the call director when all of the link relay modules are occupied. Such interrupting capability permits the placement of an emergency call if desired, which would otherwise have to wait until one of the link relay modules became available and the telephone call being maintained in the call director was subsequently transferred to the unoccupied link relay module. The person at a dial telephone having an interrupt switch merely depresses the switch once to cut in on the telephone call transpiring in the call director, enabling the interrupting person to tell the parties that their telephone call will be terminated in order to make an emergency call or announcement and, responsive to a second pressing of the button causes the reset module to cancel the original call and place the call director in its hold mode of operation enabling the interrupting connected telephone to receive dial tone for placement of the emergency call.

Description of the System Circuitry

Turning now to the specific circuitry illustrated in the composite FIG. 3, the system will now be described in terms of the circuit components that comprise the various modules that are illustrated in the schematic block diagram of FIG. 1. Additionally, FIG. 2 describes how the various FIGS. 3*a*–3*j* can be arranged to form the composite FIG. 3. It should be understood that an exhaustive circuit description is not intended and that only the operation and function of certain components therewithin will be described to present a general description of the operation of each of the modules. Thus, the circuit diagram coupled with the following description should present a clear understanding of the operation of the circuitry to one skilled in the art.

The Call Director

Since the call director is instrumental in the operation of the system of the present invention, its operation will be initially described. Referring to FIG. 3*b*, there are shown a number of horizontal lines or buses including horizontal positive and negative talk buses 40, 41, respectively, which provide the horizontal link for a talk circuit between two telephones. The talk buses 40, 41 extend the full length of the call director and are adapted to be connected to any of the telephones within the system, although only the circuitry associated with two telephones, namely, telephones 19 and 20, have been illustrated. The talk lines 40, 41 are adapted to be connected to respective telephone talk lines 42 and 43 when relay contacts 44*a* of the relay 44 are closed. Additional horizontal power buses 45 and 46 are connected to the regulated d.c. voltage output of the power supply and provide high and low d.c. voltage. A transfer bus 47 is also provided and is connected through one of the relay contacts 44a to a vertical transfer line 48. A busy lockout line 49 is also provided within the call director and it extends to each of the link relay modules.

The call director has additional horizontal buses, including buses 50 and 51 which are high and low d.c. voltage supply, a search bus 52, a register supply bus 54 and a hold bus 53.

As previously mentioned, the call director has three modes of operation in addition to its capability of operating as a last link, and these three modes have been described as search, hold and transfer modes. In its search mode, the call director applies voltage to all of the telephones that are capable of being searched. Since a dialless telephone cannot dial other telephones, such telephones are not searched. In its search mode, the search bus 52 has a high (12 v.d.c.) applied voltage which is applied through a resistor 55, a diode 56 and a resistor 57 to the base of a transistor 58 which is switched on enabling current to flow through relay 44 closing its contacts 44*a* and connecting the horizontal talk buses 40, 41 to the telephone talk lines 42, 43. All other telephones are similarly connected and have voltage applied to them and, incident to one of the dial telephones going off-hook, for example, telephone 19, will cause current to flow in the lines 42, 43 of the off-hook telephone. When the call director is in its search mode, the search bus 52, the hold bus 53 and the transfer bus 47 are at high voltage and the register bus 54 is at low voltage. It should be realized that the removal of resistor 55 will prevent search voltage from being applied to the base of transistor 58 and, accordingly, dialless telephones have this resistor removed so that search voltage is not applied.

It should also be understood that when the call director is in its search mode, busy telephones will not be searched because the busy lockout line 49 is connected through a diode 63 to the search bus 52 and, when a telephone is off-hook and busy, the line 49 is grounded which blocks the high search bus 52 from switching on transistor 58 and the relay 44 will not be closed.

To change the call director into its hold mode, responsive to a searched telephone going off-hook and drawing current, the search bus 52, hold bus 53 and transfer bus 47 are changed to low or ground voltage and the resister bus is changed to high voltage. The grounded search bus causing the relays associated with all other searched lines to open (for example, relay 44' associated with telephone 20). The off-hook telephone causes current to flow in the talk bus 40 and telephone line 42 which turns on transistors 60 and 61, energizing relay 62 to close its relay contact 62*a* which pulls in relay 44 through the hold bus 53.

To complete the telephone call by connecting the proposed telephone, dial tone is received in telephone 19 through the telephone talk lines 42, 43 and the number of the recipient telephone may be dialed. Assuming for the purposes of illustration that the telephone 20 is intended to be called, and keeping in mind that when telephone 19 is connected to the talk buses 40 and 41, and the call director is in hold mode, all of the other relays 44' are dropped out or open by virtue of the fact that the transistor 58' associated with the other telephones is off due to the switching of the search bus 52 from high to low voltage. However, in the hold mode, the register bus 54 has changed from low to high voltage and is adapted to turn on selectively the transistor 58' of the called telephone because of the interconnection between the register bus 54 through a resistor 64 and diode 65. However, three resistors 67' through 69' comprise a NOR gate which has a normally low output and is connected to a transistor 66' which is normally on to block the voltage from being applied to turn on transistor 58' unless a low voltage is applied to each of the resistors 67'–69'. As previously mentioned, all the outputs of the register equipment are high except for the three digits that are dialed which are low. Since the resistors 67–69 represent three selected digits in the units, tens and hundreds columns, it should be understood that the dialing of the number associated with telephone 20 will only shut off transistor 66 associated with the telephone 20 being called, since a high signal on any of the resistors 67–69 will maintain the transistor 66 in conduction. Thus, when all of the inputs are low, the transistor 66 will shut-off and permit the positive register voltage to switch on transistor 58' provided that the busy lockout line 49' is not low, due to the telephone 20 being busy. When transistor 58' is on talk lines 42', 43' will be connected to the talk buses 40 and 41 and thus complete the connection of the two telephones.

Since the talk lines of both telephones are connected to the talk buses and the transfer bus 47 is at low voltage, the transfer lines 48 and 48' are also at low voltage which defines the transfer mode and provides the conditions for transferring the call into an available link, responsive to a signal from the gate module 30 and link finder module 32. Following transfer and a short reset period, the call director will be returned to its search mode.

The Link Relay Modules

The link relay modules into which completed calls are transferred from the call director are substantially identical to one another and therefore their operation is identical. Accordingly, the operation will be described in terms of only one of the link relay modules. Referring to FIG. 3*c*, and particularly link relay module 15 illustrated therein, the lines 42, 43, 48 and 49 associated with telephone 19 as well as all other telephones are adapted to be connected to any one of the link control modules if an associated relay 72 is energized and its contacts 72*a* are closed. Thus, the talk lines 42, 43 of telephone 19 will be connected to horizontal talk buses 73 and 74 when the relay 72 is energized. Similarly, telephone 20 will be connected to the horizontal talk buses 73 and 74 when its associated relay 72' is energized. Each relay module also has a low voltage bus 75 as well as a transfer bus 76 and hold bus 77. Keeping in mind that the telephone transfer lines 48, 48' of the respective telephones 19 and 20 are at low voltage by virtue of their being connected in the call director, and the fact that the transfer and hold buses 76, 77 of an available link relay module are normally at low voltage prior to the transfer of a call to them, a positive transfer voltage applied to the transfer bus 76 is applied to the collector and base of transistor 80 and switches it on if the transfer line 48 is at ground. When transistor 80 is on, current flows through diode 81 and energizes relay 72 which closes its relay contacts 72*a* to make the connection between the telephone lines 42 and 43 to the talk buses 73 and 74. Since the telephone transfer line 48' of telephone 20 is also grounded, relay 72' is also energized to complete the connection between the two telephones. Once current is detected in the telephone lines by the associated link control module 24, the hold bus 77 is switched to high voltage to keep the relays 72 and 72' closed. Once this has occurred, relay 72 and 72' are now self holding relays independent of the transfer bus 76 and transfer line 48 and are only dependent upon the presence of high signal on the hold bus 77 from the link control module. This is due to the fact that once the relay 72 is closed, current will pass through diode 86, hold bus 77, relay 72, a diode 83 and one of the closed relays contacts 72a to ground. As is shown in the circuitry associated with relay 72', the ground connection is made to the low voltage bus 75, while in the circuitry associated with telephone 19 and relay 72, the ground is made through a separate line 84 which is connected to a release switch 85 at telephone 19. Thus, dial telephones having a release switch 85 are capable of permanently releasing themselves from the horizontal talk buses 73 and 74 without disturbing other connected telephones in the link relay module as might occur in a conference call. When talk line current is detected by the associated link control module, the hold bus 77 is changed to high voltage and will maintain the relays 72 and 72' energized until all telephones hang up and the link control module senses zero talk current.

Power Supply

To provide the power for supplying voltage and current requirements for the talk buses of the call director as well as the link relay modules, there is a power supply, indicated generally at 90. Each of the power supplies 90 is of similar design and comprises a regulated bridge rectifier which produces a constant 12–15 v.d.c. voltage at its outputs. With respect to the call director power supply, shown in FIG. 3*g*, a 12 v.d.c. output is provided at terminals 91 and 92 which are connected to the call director control module as well as to the call director supply buses 45 and 46, respectively, through corresponding lines 91*a* and 92*a*. Output terminals 93, 94 of an output transformer 95 provides talk voltage to the call director talk buses 40, 41 through lines 93*a* and 94*a*, and also includes a choke coil 96 to block a.c. current to the power supply. The transformer 95 also has another secondary 97 which functions as an audio frequency pick-off, its terminal 98 being connected to the register receiver module 29 as well as the call director control module through line 98*a* and pick-off terminal 99 being connected to ground through line 99*a*. The leg of the transformer having terminal 93 also has its other terminal 100 connected to a call director control module through line 100*a* so that the telephone talk line current passes through the call director control module to terminal 92 through lines 92*a*. From the foregoing, it should be understood that the tone frequency generated by the push button dialing of the telephone is transmitted from the telephone to the receiver the module 29 by passing through the call director power supply output transformer 95.

The power supplies for the link relay modules are similarly constructed, with the power supply for link relay module 15 having d.c. outputs 110 and 111 connected to its corresponding link control module through lines 110*a* and 111a, outputs 112 and 113 supplying talk voltage through lines 112*a* and 113*a* to the link relay module 15 talk buses 73 and 74. A terminal 114 passes the telephone line current through line 11*a*, the associated link control module and line 114*a* and out to the link relay module 15. An audio pick-off is similarly connected to the link control module through lines 115 and 116. Each of the other link power supplies are identical to the illustrated link power supply and have identical connections.

Link Control Modules

Since the call director control modules as well as each of the link control modules are identical in their function and circuit arrangement, only one of the link control modules 24, namely that link control module associated with link relay module 15, will be described in detail. As previously described, the link control modules provide a high voltage for the hold bus 77 in the link relay module to hold the relays connecting the telephone talk lines to the horizontal talk buses and also provides busy signal communication in the event the called telephone is busy. In addition to these functions, the link control module detects the initiation of a hook call. Assuming that a telephone call has been transferred into link relay module 15, the total telephone talk line current is passed from the link power supply through line 114*a* to the link control module. Referring to FIG. 3*f*, this current is fed to the base of a transistor 120 which places it into conduction thereby activating relay 121 which closes its associated contact 121a to provide a positive voltage at the hold output terminal 122 which is connected to the hold bus 77 of link relay module 15 through line 122a. The hold voltage is also applied to the link finder module and the ring control module associated with link relay module 15 through lines 122b and 122c, respectively.

To initiate a hook call, which has previously been defined as a procedure for adding another telephone to an existing call for the purposes of establishing a conference call between three or more telephones, the hook switch of the dial telephone in the original call is momentarily depressed and released, for example within one half second. This is effective to momentarily reduce the current in a resistor 123 causing a negative pulse which is followed by a positive pulse which is amplified and inverted by a transistor 125. The first amplified pulse triggers a monostable multivibrator defined by transistors 126, 127 and 128, charging capacitor 129 together with their associated connected resistors and capacitors.

Transistors 120 and a transistor 133 are held on by a talk current to the second telephone in the link, while the hook calling telephone has its hook switch depressed. Also a transistor 130 is held on when the monostable multivibrator is on, so the second amplified pulse will turn on transistor 131 and 132. Now transistors 130, 132 and 133 are on which activates a relay 135 closing its contacts 135a, 135b. It should be understood that transistor 132 must be switched on before the monostable multivibrator turns off in order to close the relay 135 and that if the negative pulse produced by releasing the hook switch does not occur within the prescribed time, for example one half second, transistor 130 will turn off and relay 135 will not be closed and a hook call detection will not be made.

To maintain relay 135 in closed position once a hook call signal has been detected, the closing of relay contacts 135a energizes a relay 136 by taking call director talk current from the hook search module through the link power supply audio pick-off coil. Contact 136a causes an alternate hold path for relay 135 even when transistors 130 and 132 are off, so that relay 135 is maintained in its closed condition as long as transistor 133 is on. The closing of relay contacts 135b also applies a high voltage to a terminal 137 which is connected to the link finder module 122 by line 137a. It should be understood that audio coupling has been established between the link and the call director through the hook search module. It should be noted that such coupling is only possible when the call director is in its search mode.

The link control module is also adapted to provide a busy signal to a calling telephone in the event the called telephone is busy. To initiate a busy signal a busy start pulse applied to terminal 140 supplied from the associated ring control module through line 140a is effective to turn on a relay 142 having its contacts 142a connected to a busy generator 143. The busy generator is of conventional design and is adapted to produce an intermittent busy signal of a frequency that is within the auditory range. Thus, a busy start pulse will close relay 142 to provide a continual intermittent busy signal to be applied through lines 115, 116 to the audio tap and be communicated to the telephone lines in connection. The signal will continue until the calling telephone is placed on-hook or hung up.

However, when a hook call has been detected in the link control moduel, it has previously been stated that high voltage will be applied at hook call terminal 137. This is effective to change the condition of a flip-flop defined by transistors 144 and 145, together with the resistors connected thereto. Transistor 144 is normally on when a non-hook call is being initiated, but a hook call places the transistor 144 in off condition and turns on transistor 145. When transistor 144 is off, it allows a capacitor 148 to charge through resistor 149. Upon firing of the unijunction transistor 147, a negative pulse is applied through a capacitor 150 and resistor 151 to the base of transistor 142 and is effective to shut transistor 141 off and open the relay 142. The time constant of the resistor capacitor charging circuit firing the unijunction transistor 147 is preferably about 3 or more seconds and thus permits a busy signal to be generated for only a relatively short time. Since a hook call is placed by a dial telephone in an existing conversation, it is desirable that a busy signal only be generated for a short time if the called telephone is busy, so that the busy signal will not interfere with the conversation. If it were not for the automatic termination provision, the dial telephone would be required to hang up and again call the other party in the original call which would be quite inconvenient. Thus, the link control module permits dialing of the additional telephone which, if it is busy, results in a short busy signal which is quickly terminated and the original parties in the conversation may resume their conversation.

Advantage is taken of the fact that whenever a telephone is taken off-hook transistor 132 will be on and will energize relay 155 and close its contacts 155a to produce a high voltage at terminal 156 which is connected to input 157 of the ring control module and is effective to stop the ring signal being communicated.

The Hook Search Module

Once a hook call has been detected and relay 135 closed in the link control module, link audio pick-off coil lines 115 and 116 are connected to lines 160 and 161 which are connected to the hook search module illustrated in FIG. 3b. The hook search module contains a relay 162 having contacts 162a for each of the link relay modules that are provided in the telephone system. Thus, each of the link control modules have lines similar to lines 160, 161 that terminate in similar circuitry of the hook search module. If two telephones are connected in link relay module 15 for example, one of the telephones may initiate a hook call signal which causes relay 135 to close as previously described. The link audio will then be connected to the hook search module through the link audio pick-off coil, lines 115, 116 and lines 160, 161 to permit the hook call initiating dial telephone to be connected to the call director and enable it to receive dial tone and send tone dialing information to the receiver 29 for calling an additional telephone. It should be understood that, the call director talk buses 40, 41 are connected to the relay contacts 162a so that the closing of relay 162 will close the circuit and enable the hook call initiating dial telephone to receive dial tone even though it is connected in link relay module 15. When the call director is in its search mode, relay 162 is closed and the connection is made, with the presence of current in lines 160, 162 being effective to change the call director into its hold mode in a manner substantially similar to that described previously with respect to the call director itself. Thus, the hook call initiating dial telephone will receive dial tone and dial the telephone number of the additional telephone which will result in the added telephone being connected to the call director. However, it should be understood that the hook call initiating telephone has placed a call through the call director from link relay module 15, while the additional telephone, if it is answered is connected into the talk buses 40, 41. It is therefore necessary to transfer the additional telephone into the link relay module 15 occupied by the original telephones in the call prior to the hook call being initiated in order to connect all three telephones together. Circuitry associated with the link finder module is adapted to transfer the additional telephone that has been connected by the call director into the link relay module 15 occupied by the original telephones and will now be described. The transfer occurs immediately after receiving the third dialed digit, so that ringing and other control functions are carried by the ring and control modules associated with link relay module 15.

The Link Finder Module

The link finder module 22 is adapted to find an available link relay module in which to transfer a call made through the call director and is also adapted to transfer an additional telephone that has been connected in the call director by the hook call procedure into the link occupied by the telephone initiating the hook call. Referring to the upper left hand portion of FIG. 3*e*, and recalling that a high voltage was produced in line 137*a* from the link control module when a hook call was detected, the high voltage is supplied through diode 170 as well as diode 171 and is applied to the emitter of a transistor 172. Although a connection has been shown between the link finder module and the link control module associated with link relay module 15, it should be understood from FIG. 3*e*, that all of the other link control modules are similarly connected. A positive high voltage applied to line 137*a* will pass through diode 170 into line 173 which is connected to the gate module 30 and a transfer signal from the gate module is commonly connected to the bases of the five transistors illustrated by line 174, including transistor 172. The transistor 172, as well as the other four illustrated transistors are adapted to conduct only when a ground pulse is applied to the base thereof and a positive voltage is applied to its emitter. When both of these conditions are present, a positive transfer signal is applied through line 175 to the transfer bus 76 of link relay module 15. The additional telephone connected in the call director will be connected in link relay module 15, completing the conference call and freeing the call director to be returned to its search mode.

If a non-hook or regular call is initiated, the hook call transfer portion of the circuitry just described is not utilized and the remaining circuitry illustrated in FIG. 3*e* is adapted to find an available link in which a call may be transferred from the call director. When a positive input signal from the reset module 31 is applied through line 180 to the input terminal 181 of the link finder module, a flip-flop comprising transistors 182 and 183 and connecting resistors will be set so that transistor 182 is on and transistor 183 is off. When transistor 182 is on, a capacitor 184 is adapted to be charged and cause unijunction transistor 185 to fire, preferably every 5 milliseconds, which applies negative pulses to turn off transistors 186 and 187. Thus, negative or low voltage pulses are applied to diodes 190–196. Diode 191 is connected to the gate of a silicone controlled rectifier (SCR) 197 and diode 192 is similarly connected to the gate of SCR 198 as well as the anode of SCR 197. SCR's 199, 200 and 201 are similarly connected to adjacent components. The anodes of the respective SCR's are also connected through diode 202–206 to the base of respective transistors 207–211 which are adapted to conduct if their bases are grounded and positive voltage is applied to their respective emitters, which would occur in the event a positive transfer signal is applied at terminal 212 from the reset module 31 through line 213.

With respect to the pulses being passed by transistor 187, and assuming that SCR 197 is conducting, a negative pulse applied to the gate of SCR 197 shuts off that SCR and it remains off even when the pulse again goes positive. However, the positive pulse will then be applied to the gate of SCR 198 through a capacitor 188 which was previously discharged by the low voltage on SCR 197. This will turn on SCR 198. Capacitor 189 which is typical of the other stages where the SCR was off, was fully charged by the high voltage on the anode of SCR 198 and therefore does not take any new charge and does not conduct turn on current to the next SCR 199. In this manner, the SCR's are sequentially turned on and off until the last SCR 201 is off and when all of the SCR's 197–201 are off, transistor 214 is turned off to recycle the sequencing, enabling SCR 197 to again conduct. As previously mentioned, a conducting SCR applies a ground or low voltage to be base of the transistor associated with it. If a link relay module is occupied and therefore unavailable to receive a transferred call from the call director, its hold voltage is high and is applied to the link finder module at one of the terminals 215–219. For example, if a positive hold voltage is applied at terminal 219, that voltage would be applied to the cathode of a diode 221 and therefore block a low voltage signal from passing to the base of a transistor 222 and thereby prevent it from turning on. Assuming, however, that SCR 197 is conducting and a positive voltage is not applied at terminal 215, the base of transistor 222 will be at low voltage and place transistor 222 into conduction, producing a positive pulse to the base of transistor 183 turning it on and turning off transistor 182 which terminates the firing of the unijunction transistor 185 and therefore terminates the pulses being applied to the SCR's. When transistor 183 is turned on, a transistor 225 is turned on to produce a positive voltage at output terminal 226 which is applied to gate module 30 through line 227. When a positive pulse from the reset module is applied through line 213 to the terminal 212 of the link finder module, transistors 209 will conduct and apply a positive transfer voltage to the link relay module associated with that link and causes the transfer to be made.

Ring Control Module

To provide the ring signal for activating the ringer in a called telephone, as well as to provide a busy start signal to the link control module in the event the telephone being called is busy, the telephone system of the present invention is provided with a ring control module for the call director as well as each of the link relay modules. Referring to FIG. 3*i*, a ring start voltage applied at terminal 230 from line 175 which is connected to the link finder module as well as the transfer bus 76 of link relay module 15, so that incident to a positive voltage causing transfer to the link relay module 15, an input is applied to start the generation of a ring signal to ring the telephone being called. A positive ring signal applied at terminal 230 sets flip-flop 231 which sets flip-flop 232 resulting in its output $\overline{Q}$ going low to energize relay 233 and close its contact 233*a* connecting the ring supply generator 25 and produce a ring output signal at terminal 235 which is connected by line 235*a* to the talk bus 73 of link relay module 15 and therefore to the ringer in the connected telephone. Since the ring supply signal is typically about 110 v.a.c. and at a frequency of about 28 Hertz, it is preferred that relay 233 be closed when the ring supply signal is passing through zero to maximize the life expectancy of the relay contacts 233*a*. To achieve closing of the relay contacts 233*a* at zero, flip-flop 232 has a 28 Hertz clock pulse input 236 synchronized with the ring supply generator 25 which permits flip-flop 232 to set only when the ring supply signal is passing through zero.

In the ring supply circuit, a relay 238 having contacts 238*a* is provided and will close only when ring current is present in the telephone being called. An absence of ring current will initiate a busy start signal as will be hereinafter described. The ring supply circuit additionally includes an overload relay 239 which, if energized closes its contacts 239*a* which applies a positive voltage through diode 240 to reset flip-flop 231.

If no ring current flows within a predetermined time after application of ring voltage, the ring control is adapted to reset flip-flop 231 and flip-flop 232 and thereby open ream 233 to terminate the ring supply signal. To detect the absence of ring current, a unijunction transistor 242 is provided and is connected to the Q output of flip-flop 232. When ring current is drawn, relay 238 is closed and thereby causes a transistor 243 to turn on and preclude the build up of charge in a capacitor 244, prohibiting the unijunction transistor 242 from firing. However, if there is an absence of ring current, relay 238 will not be closed and transistor 243 will remain off to enable build up of charge on capacitor 244 which will result in firing of unijunction transistor 242 which will reset flip-flop 231 and thereby terminate the ring supply signal. In this connection, it is preferred that the unijunction transistor 242 not fire until approximately 150 milliseconds have elapsed after flip-flop 232 is set.

To produce a busy start signal at output terminal 250 which is applied to the link control module through line 140*a*, the appplication of a ring start signal at terminal 230 which sets flip-flop 231 also sets a slip-flop 251 which produces a high Q output that causes a capacitor 252 to charge. If sufficient charge is built up in capacitor 252, it will cause unijunction transistor 253 to fire and turn on a transistor 254 which results in a pulse at the busy start output terminal 250. However, if ring current is present, the contacts 238*a* of relay 238 will close and apply a positive voltage to reset flip-flop 251 before the unijunction transistor 253 fires and a busy start pulse will not be produced. Thus, the busy start signal will be produced only when ring current is not present in the telephone being called on the first application of ring voltage, which would indicate that it was busy. As will be more fully described hereinafter, flip-flop 251 may also be reset when a positive signal is applied at a stop-busy start input terminal 256 which is connected to an annunciator control module 33 by line 256*a*. A signal applied to stop the starting of a busy signal will prevent the generation of a busy start signal even though ring current is not drawn. The firing of the unijunction transistor 253 also provides a pulse that is passed through diode 260 to reset flip-flop 231.

Flip-flop 231 may also be reset by the absence of hold voltage at terminal 261 from the link control module through line 122*c*, the hold voltage being effective to turn on transistor 262 and prevent the application of voltage for resetting flip-flop 231. The presence of a positive hold voltage in a link control module would be required before a telephone call is completed and ringing would be allowable. Moreover, a positive stop ring voltage at terminal 157 will reset flip-flop 231. It should therefore be understood that a ring signal will be termined when ring current in the called telephone is not detected, a busy start signal is produced, a low link hold voltage is present, the ring supply current is overloaded or a ring stop signal is received. It should also be understood that while a ring start input signal would not result in ringing on an off-hook called telephone, the lack of ring current would then initiate a busy start signal and, for that reason, it is desirable to inhibit the application of a ring start signal in certain instances. In this connection, assuming all of the link relay modules are occupied with other calls and the call director is operating as a last link, a call being sustained in the call director will be transferred to a link relay module as soon as one becomes available. When such transfer is initiated, a transfer signal would normally be applied at the start ring input terminals 230. However, the last link module is adapted to provide an input ring start ground signal at terminal 263 through line 263*a* to prevent the start ring signal from setting flip-flop 231.

To produce the intermittent ringing signal transistors 270, 274 and a flip-flop 266, together with related circuitry are provided. Initially with flip-flop 231 reset, its high $\overline{Q}$ output passes through diode 265 to hold flip-flop 266 set and the low Q of flip-flop 231 draws current to maintain timing capacitor 269 discharged. When a start ring pulse turns on flip-flop 231, removing the set input to flip-flop 266 and allows the capacitor 269 to begin charging. After a predetermined time, for example 1 to 5 seconds, a unijunction transistor 270 fires to reset flip-flop 266 and reset flip-flop 232 by applying a high voltage at R input and a low voltage at the S input of the flip-flop 232 causing relay 233 to open and terminate the ring supply signal. The $\overline{Q}$ output of flip-flop 266 is also applied to variable resistor 272 and charging capacitor 273 which is effective to fire a second unijunction transistor 274 and produce a pulse to set the flip-flop 266 which in turn sets flip-flop 232 to close relay 233. A dropping resistor 275 positioned between flip-flops 231 and 232 enables flip-flop 266 to switch the flip-flop 232, even though the Q output of flip-flop 231 remains high. Ringing continues to cycle until flip-flop 231 is reset by one of the conditions previously mentioned. An advantage of the intermittent ring circuit is that once flip-flop 231 is reset, its $\overline{Q}$ output is at high voltage and flip-flop 266 is set to permit immediate ringing when a ring start signal is applied at input terminal 230.

The Gate Module, Reset Module and Last Link Module

Because the gate module 30, the reset module 31 and the last link module 32 are closely interrelated in terms of their operation and functions, they are grouped together herein for the purpose of describing their operation. Referring to FIG. 3*h*, and particularly the upper left hand corner thereof containing the gate module 31, the upper input terminal 290 is connected through line 290*a* to the register control module 28 which applies a positive voltage thereto when the third digit of a three digit telephone number is dialed. Once the third digit is registered, it is desirable that the transfer process be initiated. A second input terminal 291 is connected to the link finger module by line 173 and has a positive voltage applied thereto in the event the call is a hook call. Once the third digit is registered a voltage will be applied at terminal 290 and, if the call is a hook call, voltage will be applied at terminals 291, both of which are effective to produce a signal at the output of AND gate 292 which is applied to the S input of monostable multivibrator 293 which is effective to produce a 20 millisecond high pulse at its Q output which turns on transistor 294, grounding line 174 and is effective to activate the hook transfer circuitry of the link finder module. The ringing $\overline{Q}$ output of MS 293 is transmitted to OR gate 305 which is effective to trigger the reset cycle or sequence which will be hereinafter described.

If a link is ready, a high voltage is applied at input 296 from line 190 connected to the link ready output of the link finder module and supplys a high voltage to AND gate 297. An inverter 298 connected to the hook signal input 291 produces a positive output to the AND gate 297 when the call is not a hook call. Therefore, when the third digit is dialed, the call is not a hook call and a link is ready to receive a transferred call, a positive output signal is produced from AND gate 297 and is passed through OR gate 299 to the S terminal of a monostable multivibrator 300. When a positive pulse is applied at the S input of MS 300, a 20 millisecond positive pulse will be produced at its Q output. During the 20 milliseconds, the low $\overline{Q}$ output of MS 300 will be applied to the base of transistor 303, turning it on to produce a positive pulse in line 213 which is connected to the link finder module which activates transfer of a call in the call director to the ready or available link relay module. After 20 milliseconds, the Q output of MS 300 again goes high to shut off transistor 303 as well as produce a high output to OR gate 305 whose output is connected to the input of a monostable multivibrator 306. This monostable multivibrator 306 causes a reset cycle which may be initiated by any of several conditions which will hereinafter be described. The MS 306 has a high Q output pulse of 40 milliseconds duration which is applied through line 180 to the link finder module and activates the link finder module to start searching for another ready or available link relay module in which to transfer a succeeding call from the call director. The high $\overline{Q}$ output of MS 306 is also applied to the base of a transistor 307, turning it on which is effective to turn off transistor 308 and turn off transistor 309. When transistor 309 is turned off, a high voltage is applied through line 310 to the transfer bus 47 of the call director. The $\overline{Q}$ output of MS 306 goes low turning off transistor 311 and 316 and therefore transmitting a low voltage through line 317*a* which is effective to cancel the information in the register module 28. The low voltage on terminal 317 also turns off transistor 321 causing a high voltage to be applied to the call director hold bus 53 through line 322*a*. These three conditions, namely, a high transfer and hold buses in the call director and a low register voltage are effective to cause any closed relays in the call director to drop out, clearing the call director to be changed to its search mode. It should be understood from the foregoing that a call may be transferred out of the call director and the call director reset within approximately 60 milliseconds after the dialing of the third digit of a called telephone number.

To complete the reset cycle and change the call direction back into its search mode, the rising $\overline{Q}$ output of MS 306 and sets flip-flop 312 which produces a high Q output that is applied to transistor 307 which causes a low voltage in the line 310 and the call director transfer bus 47. When the Q output of flip-flop 312 is high, the $\overline{Q}$ output is low and turns on transistor 313 which produces a high voltage at terminal 314 which is connected through line 314*a* to the search bus 52 of the call director. As previously described, the call director in its search mode requires that its search bus 52 be at a high voltage. Additionally, a low $\overline{Q}$ output from flip-flop 312 is effective to turn off transistor 315 and 316 which produces a low voltage at terminal 317 which is connected through line 317*a* to the register control module 28 and the call director register bus 54. When transistor 316 is off, transistor 321 is off, which results in a high voltage being present at terminal 322 which is connected to the call director hold bus 53 through line 322*a*. As previously mentioned, the hold bus is also required to be at high voltage when the call director is in its search mode. It should be understood from the above that all of the bus voltage requirements of the call director when operation in its search mode have been satisfied, since the register bus 54 is now low and the search, hold and transfer buses 52, 53 and 47, respectively are high.

In the event all of the link relay modules are occupied with existing telephone calls, the call director will function as a last link and maintain the completed call therein until one of the link relay modules becomes available to receive a transferred call. Referring to the gate module illustrated in FIG. 3*h*, the dialing of a third registered digit, the indication that the call is not a hook call and, by virtue of an inverter 325, the indication that a link is not ready, causes an AND gate 326 to provide a positive output to set flip-flop 301 to produce a high Q output that is connected to an AND gate 328. Thus, when the Q output of flip-flop 301 is high, a transfer signal will not be given and the call director will not be changed back to its search mode. Since the Q output of flip-flop 301 that is applied to AND gate 328 is also applied to an AND gate 329 and, if the third digit has been dialed, a low voltage will be applied to terminal 330 from the register control module 28 and transmitted as a high voltage from transistor 320 to AND gate 329 resulting in a positive output pulse that is applied through line 331 to the ring start input of the call director ring module. A positive signal that the call director ring module is ringing is applied through line 332, while an indication that a busy signal is being applied causes a positive signal at terminal 333. Either of these indications will produce a positive output in OR gate 334 which is applied to an AND gate 335 as well as through a delay component 336 and an inverter 337.

Once a link becomes available, a positive link ready signal will also be applied to the AND gate 335 and if OR gate 334 is on, the AND gate 335 will send a pulse to OR gate 299 causing a transfer to a ready link and will initiate the reset sequence previously described. With respect to the AND gate 328, a positive output signal will be applied to OR gate 299 as well as to a monostable multivibrator 340 if a link is ready, the call director was operating as a last link, the call director ring and control modules were neither ringing nor providing a busy signal and third digit was registered. The positive output of AND gate 328 will provide a positive Q output from MS 340 and will turn on transistor 341 providing a low voltage output at terminal 342 which is connected through line 263*a* to the inhibit ring start input of the ring control modules. This is required to prevent the application of ring voltage or busy signal to a link relay module when the conversation is already in progress prior to the transfer of the call from the call director.

If the call director control module is providing a positive hold voltage, it is applied to input line 343 and is effective to reset flip-flop 312 which stops the call director from searching whenever a line is drawing talk current from the call director supply. Also, the positive hold voltage is applied to an inverter 344 which is connected to the R input of flip-flop 301 as well as OR gate 305. Thus, if the call director control module is not providing a positive hold voltage, a high voltage would be applied to the R input of flip-flop 301 to cancel last link mode of operation as well as to OR gate 305 which would result in the initiation of a start search for ready link signal and the initiation of the reset sequence of the call director as previously described. If a hook call is initiated while the call director is operating as a last link, a positive voltage will be applied from the call director control module in line 346 and will reset flip-flop 301 and also to turn on transistor 347 which would turn off transistors 315 and 316 and maintain terminal 317 at low voltage long enough to cancel the register so that dial tone may be provided and coding entered to identify the call director relay of the additional line desired in the conference call. A high $\overline{Q}$ output from flip-flop 312 is applied to a time limit element 350 which is effective to provide a false third digit register ground pulse after a time of about 15 seconds at terminal 351 which is connected through line 351*a* to terminal 330 which turns on transistor 320 and is effective to produce a false third digit register pulse at output 353 which is connected to input terminal 290 by line 353*a*. This will cause transfer of a calling telephone to a link before the called telephone is connected and will ultimately result in a busy signal being produced. This is done to prevent an individual line from tying up the call director and therefore the system indefinitely. The time limit element 350 is disabled when the call director is operating as a last link by the high $\overline{Q}$ output of flip-flop 301. A restart element 355 is also provided between the inverter 344 and the flip-flop 312 so that if the call director is not holding, an approximately 5 second delayed positive pulse is supplied to set flip-flop 312 to change the call director back into its search mode.

The Annunciator Control Module

The annunciator control module 33 performs several functions, including the initiation of a signal to sound the chime 34 when a dialless telephone is taken off-hook and also provides a stop-busy start pulse to the ring control modules for the purpose of preventing the starting of a busy signal in the event a dialless telephone is taken off-hook and held by the person waiting for a dial telephone to respond to the visual indication on the annunciator light panel. As previously described, the fact that the dialless telephone is off-hook would preclude the presence of ring current and cause the busy signal to rsult in accordance with the previously described operation of the ring control module 23. The annunciator control module also provides a pulse output signal for providing a flashing at reduced brilliance on the annunciator light panel for those telephones that are busy. In addition to these described functions, the annunciator control module provides a limit to the number of lamps that can be turned on in the annunciator 17. Referring to the upper left portion of FIG. 3*d*, an input terminal 370 is connected by line 371 to the annunciator 17, which supplies a voltage level that is in direct proportion to the number of lights that are on at any one time. Thus, the signal is applied to a field effect transistors 372 which functions as a pulse chopper and allows steady state d.c. voltage to pass to resistors 373 and 374 and is applied to the base of a transistor 375 which is adapted to turn on when the voltage exceeds a predetermined level indicating, for example, that 10 lamps are on in the annunciator light panel which may represent the desired limit. When transistor 375 is on, transistor 376 is turned on which turns on transistor 377 resulting in a positive output at terminal 378 which is applied through line 379 to the annunciator and is effective to block the turn on of additional lamps in the annunciator light panel. It should be understood that the voltage supplied to the base of transistor 375 indicates the number of lamps that are on with the d.c. level incrementally increasing for additional call in signals and incrementally decreasing when the lamp for a telephone is turned off. The signal from the field effect transistor 372 is also connected to a filtering capacitor 381 and a differentiating capacitor 382 which, together with resistor 383, differentiates the signal to produce a positive pulse for an incoming call and a negative pulse for an answered call. The pulses are then amplified by transistor 384 and pass through threshold diodes 385, 386 and are applied to transistor 387 biased midway which turns on responsive to a negative call answered pulse and turns off for a positive incoming call pulse. When transistor 387 is off, a transistor 388 is off which turns off transistor 389 which is effective to turn on transistors 390, and 391 producing a positive pulse at output terminal 392 which is connected to the chime 34 through lines 393 and thereby sounds the chime responsive to an incoming call pulse. Chime current is taken from an energy storage capacitor 394 rather than from the main supply.

When the transistor 387 is on, transistor 388 is on and a chime pulse will not be produced. Thus, a negative pulse indicating that a call has been answered will turn on transistor 387, turns off a transistor 395, which turns on transistor 396 and produces a stop busy start pulse at output terminal 397 which is applied to the ring control modules through line 256*a* and prevents the starting of a busy signal even though the telephone being called is off-hook.

When a telephone is busy, the annunciator light panel is provided with a signal that produces a flashing reduced brightness in the lamp associated with the busy telephone. To provide such a flashing reduced brightness, the annunciator control module has an astable oscillator comprising transistors 400 and 401 together with the resistors, capacitors and diodes that are connected thereto. When transistor 401 is off, a unijunction transistor 402 will fire to produce pulses that will momentarily turn on transistor 403 in the event a switch 404 is in the illustrated position enabling a capacitor 405 to sustain charge build up that will fire the unijunction transistor 402. Transistors 403, 406 and 411 and the resistors connected thereto define a monostable multivibrator which, when transistor 403 is on, turns on transistor 407 resulting in a positive pulse at output terminal 408, which is connected to the annunciator through line 409. The pulses are also applied to the emitter of field effect transistor 372 effectively operating this transistor as a chopper to block the lamp current in the flashing lamps from affecting the call in or call answer voltage on capacitor 381. The duration of each of the pulses at output terminal 408 determines the amount of reduced brightness in the lights of the annunciator light panel and the brightness is a function of the length of time transistor 403 is on before it is turned off. A variable resistor 410 regulates the firing time of the unijunction transistor 411 which, when it fires is effective to turn on transistor 406 which terminates the pulse at output 408. In the event the switch 404 is switched to its alternate on-off position preventing the unijunction transistor 402 from firing, the completion of dialing of the third digit of a telephone number supplies a pulse to terminal 413 from line 414 which is effective to turn on transistor 403 and produce a single pulse at the output terminal 408. When unijunction transistor 411 fires to turn on transistor 406 and turn off transistor 403, the falling edge of the output pulse at terminal 408 will be effective to turn off the light associated with the telephone being called in the annunciator light panel. However, when the telephone is busy, it associated light will not have flashing capability since a pulse output is not provided when the switch 404 is in its alternate off position.

The Annunciator

The annunciator illustrated in FIG. 3*a*, is adapted to turn on lamps associated with telephones that go off-hook and give a full brightness indication. Once the telephone is busy, the lamps will be flashed at a level of reduced brilliance enabling an administrator to visually see which telephones are currently being used. It should be understood that an annunciator circuit may be provided for each of the telephones within the system, if desired, and although only two of the circuits associated with each of the telephones are shown, the operation of each of the circuits is identical. Referring to the left portion of the FIG. 3*a*, the pulse generator output from the annunciator control module is applied to a horizontal bus 415 through line 409 and is connected to each of the circuits associated with the telephones. An annunciator stop bus 416 is also provided and is connected through lines 379 to the annunciator control module. A supply bus 417 is also provided as well as a low supply bus 418 that is connected to line 371 to the annunciator control module. Each of the circuits has a terminal 419 that is connected to a lamp 420 by line 421 so that when a transistor 422 is on, the lamp associated with the particular telephone will be on. The line 424 extends to each of the telephones and when that telephone goes off-hook, line 424 is at ground and switches on transistor 422 to light the lamp 420. Bus 415 is connected to the collector of transistor 425 which also has its base connected to the supply bus 417 as well as to terminal 426 which is connected to busy lockout line 49 in the call director. Another terminal 427 is connected to transfer line 48 in the call director such that when either of lines 426 or 427 are grounded as would occur when the telephones are busy resulting in transistor 425 being turned off. More specifically, line 427 is grounded when a call is transpiring in the call director operating as a last link, and line 426 is grounded when a call is occurring in one of the link relay modules.

When transistor 422 is on, it turns on transistor 430 which has its collector connected to the base of transistor 422 and is operable to lock transistor 422 on. If either of lines 426 or 427 are grounded the transistor 425 will turn off enabling the pulses being applied to the bus 415 to be applied to the base of transistor 430 which intermittently turns transistor 430 as well as transistor 422 on and off to produce a lower RMS voltage burst to lamp 420 dim and flash it at a level of reduced brightness.

In the event a positive output is transmitted to the stop bus 416 through line 379 from the annunciator control module it is applied to the base circuit of transistor 422 and prevents it as well as all other similar transistors from receiving a negative turn on pulse. Circuits already on are not affected and will remain on. If the switch 404 in the annunciator control module is placed in its off position resulting in no series of pulses being generated and applied to the annunciator bus 415, the pulse supplied by the dialing of the third digit will be transmitted to the bus 415 and its trailing edge will be effective to turn off transistor 430 and 422 resulting in the light 420 turning off upon the completion of the dialing of the telephone number of the called telephone. Thus, the annunciator and annunciator control panel are adapted to terminate a light when a call is initially completed or, alternatively, cause the light to flash at a level of reduced brilliance until the call is terminated.

Emergency Interrupt Module

It should be understood that when all of the link relay modules are occupied with existing calls and if a call director is operating as a last link, it is not possible to complete an additional telephone call until one of the calls in the system is terminated which would result in the call director being changed to its search mode. In the event an emergency call is required, an emergency interrupt module may be provided in the system to enable a telephone having an emergency interrupt push-button to cut in upon the telephone call being sustained in the call director operating as a last link and thereafter cancel that call to permit the call director to change to its hold mode and permit the call to be made in the normal way.

Referring to FIG. 4, selected dial telephones may be provided with an emergency interrupt push button 435 which, when it is depressed, provides a ground signal at the emitter of a transistor 436 to turn in on providing that a line 437 is not grounded. The line 437 is connected to busy lockout line 49 and another line 438 is connected to transfer line 48. As previously described, when the call director is operating as a last link, the transfer line 48 is grounded and busy lockout line 49 is not. Thus, when transistor 436 is turned on responsive to an initial depression of the push button 435, a transistor 439 is turned off which causes voltage to be applied to the base of transistor 440 as well as to the gate of a silicone controlled rectifier 441. The voltage supplied to the transistor 440 must pass through capacitor 442 and resistors 443 and 444 which provide a time delay, preferably in the range of about 100 milliseconds. Similarly, resistors 445, 446 and capacitor 447 provide a time delay for the voltage being applied to the gate of SCR 441, preferably of about 900 milliseconds. Thus, responsive to a first depression of the emergency interrupt push button 435, transistor 436 will turn on and pull in the main relay 44 in the call director and establish voice communication between the interrupting telephone and the existing call being sustained in the call director. At this time the person may inform them that the call will be terminated for the purpose of placing an emergency telephone call.

The delay network are effective to turn on transistor 440 after 100 milliseconds and to gate the SCR 441 after approximately 900 milliseconds. Thus, when the push button 435 is momentarily pressed, transistor 441 will be turned on and off before SCR 441 is gated. However, when the push button 435 is depressed a second time, transistor 439 will turn off, turning on transistor 440 as well as the SCR 441 which is effective to provide a negative pulse at terminal 450 which is connected to terminal 456 in the gate module 30 and is effective to momentarily cancel the transfer bus 47 in the call director. A ground pulse is also provided at terminal 451 which is connected to an input 457 in the reset module (see FIG. 3*h*) and is effective to momentarily cancel the register and call director register bus 54 and the call director hold bus 53. Simultaneously, terminal 455 is maintained at high voltage by the hold signal from the call director control module. Since the interrupting telephone is connected to the call director after the push button 435 was initially depressed, the second pressing of the push button cancels all other relays in the call director and changes the call director hold mode and the interrupting telephone will then receive dial tone and be able to place the emergency call.

It should be understood from the foregoing description of the private administrative telephone system of the present invention, that it has many desirable features that contribute to its convenient operation for persons using it. Its capability of providing administrative control over the use of the dialless telephones together with its ability to automatically complete dialed telephone calls provide a modern private automatic telephone system that is particularly adapted for use in schools and other facilities where the feature of administrative control over the use of certain telephones is desired. In this connection, it is believed that the present invention satisfies all of the objects and advantages that have been hereinbefore described.

What is claimed is:

1. In a private automatic telephone system having a plurality of dial and dialless telephones, the system comprising register means for transmitting a dial tone and for receiving and transmitting a dial coding information signal responsive to the dialing of a number of another telephone at an off-hook, non-busy dial telephone, means for producing a busy signal in the event said dialed telephone is busy, means for producing a ring signal in the event the dialed telephone is not busy, call directing means adapted to be connected to any of said telephones, said call directing means being adapted to search all non-busy dial telephones and detect and connect the first existing off-hook non-busy dial telephone while isolating all other telephones from said call directing means and provide a link for connecting said off-hook dial telephone to any one of said other dial or dialless telephones when its associated number is dialed to complete a call, means for initiating a call from any of the dialless telephones including an annunciator having a lighted visual display with a respective indicator for each dialless telephone, said annunciator including means responsive to the going off-hook of each dialless telephone for lighting at full brightness the respective indicator of a dialless telephone which has gone off-hook, thereby enabling a person seeing a lighted indicator to respond to the associated dialless telephone by taking a dial telephone off-hook and dialing the number of said associated dialless telephone to connect said dial and dialless telephones, said annunciator further including means for maintaining at full brightness the respective indicator of each dialless telephone which has gone off-hook but has not been responded to by being called from a dial telephone, and means for maintaining at less than full brightness the respective indicator of each dialless telephone which has been responded to by being called from a dial telephone and is therefore busy.

2. A private automatic telephone system as defined in claim 1 further including sounding means associated with said annunciator to provide an audio indication of a dialless telephone going off-hook for the purpose of initiating a call.

3. A private automatic telephone system as defined in claim 1 wherein the respective indicator of each dialless telephone which has gone off-hook is maintained at full brightness until it is responded to by being called from a dial telephone, even though said dialless telephone is subsequently placed on-hook.

4. A private automatic telephone system as defined in claim 1 further including at least one link means in addition to said call directing means link, each of said link means being adapted to receive and maintain a completed call when transferred from said call directing means, thus freeing said call directing means for searching other non-busy dial telephones for a subsequent off-hook non-busy dial telephone.

5. In a private automatic telephone system having a plurality of dial and dialless telephones, call directing means having a link and being adapted to connect a first one of said dial telephones to said call directing link is response to said first dial telephone going off hook, register means for transmitting a dail tone to said first dial telephone and for receiving and transmitting a coding signal responsive to the dialing of the number of a second telephone by said first dial telephone, means responsive to said register means for connecting said telephone to said call directing link thereby establishing an initial connection between said first and second telephones, a link means in addition to said call directing link adapted to receive and maintain the connection initially made in said call directing link, transfer means responsive to completion of transmission of said coding signal for transferring the connection from said call directing link to said link means immediately upon transmission of said coding signal, means responsive to said transfer means for resetting said call directing means after transfer, thereby to free said call directing means for detecting and connecting subsequent off hook dial telephones, means associated with said link means for producing a busy signal in the event said second telephone is busy and for producing a ring signal in the event said second telephone is not busy, whereby when said second telephone is answered in response to said ring signal a talking path is established over said link means.

6. A private automatic telephone system as defined in claim 5 including two or more link means in addition to said call directing link, and link finding means for selecting an unoccupied link means into which said connection initially made in said call directing link may be transferred.

7. A private automatic telephone system as defined in claim 6 further including means for connecting an additional telephone into a connection existing in a link means to provide a conference call among said telephones connected in said link means and said additional telephones, including means for detecting a signal initiated at a dial telephone in said original connection, means responsive to said signal for providing to said signaling dial telephone access to said call directing link while maintaining said original connection in said link means, thereby to allow said signaling telephone to dial the number of said additional telephone and causing said means responsive to said register means to establish an initial connection of said additional telephone to said call directing link, and means associated with said transfer means for transferring said additional telephone from said call directing link to said link means in which said original connection was maintained, thereby to complete the connection among said telephones in a conference call.

8. A private automatic telephone system as defined in claim 6 further including means responsive to said link finding means for temporarily maintaining said initial connection in said call directing link in the event all of said link means are occupied, means associated with said call directing link for producing a busy signal or a ring signal in the event said second telephone temporarily connected in said call directing link is busy or not busy respectively, said means responsive to said link finding means adapted to initiate transfer of said connection temporarily maintained in said call directing link to a link means when one of said link means becomes unoccupied, whereby when said second telephone is answered in response to said ring signal a talking path is established over said call directing link and maintained therein until said link finding means locates an unoccupied link means initiates transfer of the temporarily maintained connection to the unoccupied link means.

9. A private automatic telephone system for use in schools or the like where administrative control of the telephone system is desired comprising in combination, a plurality of dial and dialless telephones each having a hook switch and a ringer, a plurality of telephone lines one of which is associated with each of said telephones, call directing means including a link, said call directing means adapted to search all non-busy dial telephones and detect and connect a first off-hook non-busy dial telephone to said call directing link, register means for transmitting a dial tone to said first telephone and for receiving and transmitting a coding signal responsive to the dialing of the number of a selected second telephone by said first telephone, means responsive to said register means for connecting said second telephone to said call directing link thereby establishing an initial connection between said first and said second telephones, a link means in addition to said call directing link being adapted to receive and maintain the connection initially made in said call directing link, transfer means responsive to the completion of transmission of said coding signal for transferring the connection from said call directing link to said link means upon completion of transmission of said coding signal, means associated with said link means and responsive to said transfer means for producing a ring signal for ringing the ringer of said selected second telephone upon transfer of said initial connection to said link means, means for producing a busy signal to said first telephone in the event said second telephone is busy, and means responsive to said transfer means for resetting said call directing means subsequent to said transfer, whereby after said transfer of said initial connection said call directing means is freed to search all other non-busy dial telephones and detect and connect a subsequent off-hook dial telephone while said ringing of said second telephone ringer is accomplished while said connection is maintained in said link means.

10. A private automatic telephone system as defined in claim 9 including at least two link means in addition to said call directing link and link finding means for selecting an available link means into which said initial connection made in said call directing link may be transferred by said transferring means.

11. A private automatic telephone system as defined in claim 9 wherein said ring signal producing means includes a relay controlled by a flip-flop, said flip-flop normally maintained in its first stable state causing the contacts of said relay to be open and driven into its second stable state when ring signal is required causing said contacts to close, said flip-flop being set and reset to produce intermittent ring signals that are separated by pauses therebetween, thereby to produce substantially instant ringing in said second selected telephone upon completion of dialing of said selected telephone, in the event said second selected telephone is not busy.

12. A private automatic telephone system as defined in claim 11 further including means for adjusting the rate of setting and resetting of said flip-flop thereby making adjustable the duration of each of said intermittent ring signals as well as the duration of said power between said ring signals.

13. A private automatic telephone system as defined in claim 11 wherein the ring signal producing means includes a signal generator for producing an alternating current ring signal and a switching means for isolating said generator from the output of said ring signal producing means, said ring signal producing means being adapted to close said switching means to produce a ring signal in said second selected telephone when said alternating current passes through zero.

14. A private automatic telephone system as defined in claim 13 wherein said ring signal producing means includes a clock means synchronized to the frequency of said ring signal generator alternating current frequency such that said clock means is adapted to enable closing of said switching means only when said clock means signal is passing through zero.

15. A private telephone system as defined in claim 9 wherein said busy signal producing means produces said busy signal to said first telephone upon completion of dialing of said second complete telephone number in the event said second telephone is busy, the busy condition of said second telephone being detected by said ring signal producing means responsive to the absence of ring current in said second telephone indicating that said second telephone is off-hook.

16. A private automatic telephone system as defined in claim 10 including means for temporarily maintaining said initial connection between said first and second telephones in said call directing link in the event all of said link means are occupied thereby to provide a communications path in said call directing link.

17. A private automatic telephone system as defined in claim 10 wherein said first dial telephone is connected to said second selected telephone in a link means, said system further including means for sequentially connecting one or more additional telephones to provide a conference call among said first and second telephones and said one or more additional telephones, including means for detecting a signal from one of said dial telephones in said link means indicating that said additional telephone is to be added to make a conference call, means responsive to the detection of said signal for holding said first and second telephones in said link means and providing to said signaling telephone access to said call directing link thereto to allow said signaling dial telephone to receive a dial tone for dialing the preselected number of said additional telephone, said means responsive to said register means being effective to provide an initial connection of said additional telephone to said call directing link and said transfer means being effective to transfer said initial connection to said link means wherein the connection between said first and second telephone had been maintained, such that said first, second and additional telephones are connected in a conference call.

18. A private automatic telephone system as defined in claim 17 wherein said first dial telephone may be put on-hook without severing the connection between said first, second and additional telephones, thus permitting the person at said first telephone to take his telephone off-hook and intermittently monitor said conference call if desired.

19. A private automatic telephone system defined in claim 17 wherein said first dial telephone includes release means for permanently severing said first telephone from said conference call to enable said first telephone to initiate or receive other telephone calls.

20. A private automatic telephone system as defined in claim 10 wherein said transferring and resetting means are adapted to maintain a connection between said first and second telephones in said call directing link in the event all of said link means are occupied thereby to provide a talking path in said call directing link, and responsive to a link means becoming available, are adapted to transfer said connection between said first and second telephones from said call directing link to said available link means and thus free said call directing means for searching additional off-hook, non-busy telephones.

21. A private automatic telephone system as defined in claim 20 including means for interrupting said call directing means in the event all of said link means and said call directing means link are occupied, to permit the initiation of an emergency call.

22. A private automatic telephone system as defined in claim 10 wherein said call directing means is adapted to detect and connect a first off-hook dial telephone when said call directing means is searching in its search mode, said search mode applying voltage to all non-busy dial telephones, said call director changing from said search mode to a hold mode responsive to a non-busy dial telephone going off-hook and causing current to flow in said off-hook dial telephone which is effective to generally simultaneously remove voltage from all other previously searched non-busy dial telephones and isolate them from the call directing means.

23. A private automatic telephone system as defined in claim 22 wherein said call directing means changes from holding mode of operation to transfer mode of operation substantially upon completion of dialing of a selected telephone number associated with said second telephone, the changing of said call directing means from said hold mode to said transfer mode initiating said transferring means to transfer said connected first telephone and said selected second telephone to an available link means, which transfer initiates said resetting means to change said call directing means back into its search mode.

24. A private automatic telephone system as defined in claim 23 wherein said resetting means is adapted to automatically change said call directing means back into its search mode within a preselected time period, said time period being in excess of the time duration normally required to complete the dialing of a complete telephone number, said automatic resetting substantially reducing the possibility of a slow dialing party precluding access to the call directing means by other telephones.

25. A private automatic telephone system as defined in claim 24 wherein said resetting means automatically initiates said transferring means to transfer said connected first telephone to an available link means, said transfer initiating said busy signal producing means to produce a busy signal in said first telephone in the event dialing of said first telephone was not completed within said predetermined time period.

26. A private automatic telephone system as defined in claim 10 wherein the telephone numbers of the respective telephones are adapted to be coded to correspond to the architectural room number, of a room in which they are located.

* * * * *